US008782556B2

(12) United States Patent
Badger et al.

(10) Patent No.: US 8,782,556 B2
(45) Date of Patent: Jul. 15, 2014

(54) USER-CENTRIC SOFT KEYBOARD PREDICTIVE TECHNOLOGIES

(75) Inventors: Eric Norman Badger, Issaquah, WA (US); Drew Elliot Linerud, Duvall, WA (US); Itai Almog, Redmond, WA (US); Timothy S. Paek, Sammamish, WA (US); Parthasarathy Sundararajan, Bellevue, WA (US); Dmytro Rudchenko, Bellevue, WA (US); Asela J. Gunawardana, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 12/729,130

(22) Filed: Mar. 22, 2010

(65) Prior Publication Data

US 2011/0202876 A1 Aug. 18, 2011

Related U.S. Application Data

(60) Provisional application No. 61/304,341, filed on Feb. 12, 2010.

(51) Int. Cl.
*G06F 3/048* (2013.01)

(52) U.S. Cl.
USPC ........................................................ 715/816

(58) Field of Classification Search
USPC ......... 715/256, 257, 259–263, 271, 705, 707, 715/708, 710, 711, 713, 714, 715, 764, 780, 715/808, 809, 810, 811, 812, 816, 825, 863, 715/864, 866; 704/10; 382/224–231
See application file for complete search history.

(56) References Cited

U.S. PATENT DOCUMENTS

| | | | |
|---|---|---|---|
| 5,748,512 | A | 5/1998 | Vargas |
| 5,896,321 | A | 4/1999 | Miller et al. |
| 6,282,507 | B1 | 8/2001 | Horiguchi et al. |
| 6,377,965 | B1 | 4/2002 | Hachamovitch et al. |
| 6,421,655 | B1 | 7/2002 | Horvitz et al. |
| 6,490,698 | B1 | 12/2002 | Horvitz et al. |
| 6,556,841 | B2 | 4/2003 | Yu |
| 6,573,844 | B1 | 6/2003 | Venolia et al. |

(Continued)

FOREIGN PATENT DOCUMENTS

| | | |
|---|---|---|
| CN | 101369216 A | 2/2009 |
| WO | WO 2008/120033 A1 | 10/2008 |

OTHER PUBLICATIONS

Stocky et al., "A Commonsense Approach to Predictive Text Entry," *CHI 2004*, Apr. 2004, 4 pages.

(Continued)

*Primary Examiner* — Enrique Iturralde
(74) *Attorney, Agent, or Firm* — Andrew Sanders; Micky Minhas

(57) ABSTRACT

An apparatus and method are disclosed for providing feedback and guidance to touch screen device users to improve text entry user experience and performance by generating input history data including character probabilities, word probabilities, and touch models. According to one embodiment, a method comprises receiving first input data, automatically learning user tendencies based on the first input data to generate input history data, receiving second input data, and generating auto-corrections or suggestion candidates for one or more words of the second input data based on the input history data. The user can then select one of the suggestion candidates to replace a selected word with the selected suggestion candidate.

25 Claims, 19 Drawing Sheets

(56) References Cited

U.S. PATENT DOCUMENTS

| | | |
|---|---|---|
| 6,646,572 B1 | 11/2003 | Brand |
| 6,654,733 B1 | 11/2003 | Goodman et al. |
| 6,801,190 B1 | 10/2004 | Robinson et al. |
| 6,931,384 B1 | 8/2005 | Horvitz et al. |
| 6,989,822 B2 | 1/2006 | Pettiross et al. |
| 7,030,863 B2 | 4/2006 | Longe et al. |
| 7,088,345 B2 | 8/2006 | Robinson et al. |
| 7,103,544 B2 | 9/2006 | Mahajan et al. |
| 7,106,312 B2 | 9/2006 | Pennington, II et al. |
| 7,117,153 B2 | 10/2006 | Mahajan et al. |
| 7,120,477 B2 | 10/2006 | Huang |
| 7,149,970 B1* | 12/2006 | Pratley et al. .................. 715/257 |
| 7,171,353 B2 | 1/2007 | Trower, II et al. |
| 7,200,267 B1 | 4/2007 | Bennett et al. |
| 7,277,088 B2 | 10/2007 | Robinson et al. |
| 7,293,231 B1 | 11/2007 | Gunn et al. |
| 7,313,516 B2* | 12/2007 | Oshima ........................... 704/10 |
| 7,319,957 B2 | 1/2008 | Robinson et al. |
| 7,350,145 B2* | 3/2008 | Wolpe ........................... 715/271 |
| 7,370,275 B2* | 5/2008 | Haluptzok et al. ............. 715/264 |
| 7,406,662 B2 | 7/2008 | Seto et al. |
| 7,443,316 B2* | 10/2008 | Lim .................................. 341/22 |
| 7,458,029 B2 | 11/2008 | Agrawala et al. |
| 7,461,059 B2* | 12/2008 | Richardson et al. ................... 1/1 |
| 7,477,233 B2 | 1/2009 | Duncan et al. |
| 7,506,254 B2* | 3/2009 | Franz ............................. 715/259 |
| 7,508,324 B2* | 3/2009 | Suraqui ........................... 341/22 |
| 7,561,145 B2 | 7/2009 | Garside et al. |
| 7,574,672 B2* | 8/2009 | Jobs et al. ...................... 715/830 |
| 7,580,908 B1 | 8/2009 | Horvitz et al. |
| 7,580,925 B2 | 8/2009 | Unruh et al. |
| 7,616,191 B2 | 11/2009 | Matta |
| 7,620,631 B2 | 11/2009 | Paek et al. |
| 7,630,980 B2* | 12/2009 | Parikh .................................. 1/1 |
| 7,634,720 B2* | 12/2009 | Haluptzok et al. ............. 715/234 |
| 7,689,420 B2 | 3/2010 | Paek et al. |
| 7,694,231 B2* | 4/2010 | Kocienda et al. .............. 715/773 |
| 7,701,449 B2 | 4/2010 | Pettiross et al. |
| 7,707,131 B2 | 4/2010 | Chickering et al. |
| 7,793,228 B2* | 9/2010 | Mansfield et al. ............. 715/780 |
| 8,010,465 B2* | 8/2011 | Badger et al. ..................... 706/11 |
| 2003/0214539 A1 | 11/2003 | Iwema et al. |
| 2004/0021691 A1 | 2/2004 | Dostie et al. |
| 2004/0183833 A1 | 9/2004 | Chua |
| 2004/0217944 A1 | 11/2004 | Kong |
| 2005/0024324 A1 | 2/2005 | Tomasi et al. |
| 2005/0099406 A1 | 5/2005 | Pettiross et al. |
| 2005/0099407 A1 | 5/2005 | Pennington, II et al. |
| 2005/0099408 A1 | 5/2005 | Seto et al. |
| 2005/0149882 A1 | 7/2005 | Iwema et al. |
| 2005/0283726 A1* | 12/2005 | Lunati ............................. 715/533 |
| 2006/0007190 A1 | 1/2006 | Pettiross et al. |
| 2006/0073818 A1 | 4/2006 | Scott |
| 2006/0206815 A1 | 9/2006 | Pathiyal et al. |
| 2006/0209014 A1 | 9/2006 | Duncan et al. |
| 2006/0210958 A1 | 9/2006 | Rimas-Ribikauskas et al. |
| 2006/0235700 A1 | 10/2006 | Wong et al. |
| 2006/0256139 A1 | 11/2006 | Gikandi |
| 2006/0265668 A1 | 11/2006 | Rainisto |
| 2006/0274051 A1* | 12/2006 | Longe et al. ................... 345/173 |
| 2006/0282575 A1 | 12/2006 | Schultz et al. |
| 2007/0005670 A1 | 1/2007 | Pennington, II et al. |
| 2007/0036292 A1 | 2/2007 | Selbie et al. |
| 2007/0040813 A1* | 2/2007 | Kushler et al. ................. 345/173 |
| 2007/0089070 A1* | 4/2007 | Jaczyk ........................... 715/816 |
| 2007/0233497 A1 | 10/2007 | Paek et al. |
| 2007/0239453 A1 | 10/2007 | Paek et al. |
| 2007/0239454 A1 | 10/2007 | Paek et al. |
| 2008/0072143 A1* | 3/2008 | Assadollahi .................... 715/261 |
| 2008/0133220 A1 | 6/2008 | Paek et al. |
| 2008/0189605 A1* | 8/2008 | Kay et al. ....................... 715/257 |
| 2008/0195388 A1* | 8/2008 | Bower et al. ................... 704/243 |
| 2008/0195571 A1* | 8/2008 | Furuuchi et al. ................. 706/56 |
| 2008/0243834 A1* | 10/2008 | Rieman et al. ..................... 707/5 |
| 2008/0291325 A1 | 11/2008 | Teegan et al. |
| 2008/0294982 A1* | 11/2008 | Leung et al. ................... 715/261 |
| 2009/0006100 A1 | 1/2009 | Badger et al. |
| 2009/0009367 A1* | 1/2009 | Hirshberg ........................ 341/22 |
| 2009/0009494 A1 | 1/2009 | Lee |
| 2009/0054123 A1 | 2/2009 | Mityagin et al. |
| 2009/0100340 A1 | 4/2009 | Paek et al. |
| 2009/0150322 A1 | 6/2009 | Bower et al. |
| 2009/0150341 A1 | 6/2009 | Paek et al. |
| 2009/0182552 A1 | 7/2009 | Fyke et al. |
| 2009/0195506 A1 | 8/2009 | Geidl et al. |
| 2009/0213134 A1 | 8/2009 | Stephanick et al. |
| 2009/0216690 A1 | 8/2009 | Badger et al. |
| 2009/0225041 A1 | 9/2009 | Kida et al. |
| 2009/0284471 A1 | 11/2009 | Longe et al. |
| 2009/0287626 A1 | 11/2009 | Paek et al. |
| 2009/0287680 A1 | 11/2009 | Paek et al. |
| 2009/0287681 A1 | 11/2009 | Paek et al. |
| 2009/0295737 A1 | 12/2009 | Goldsmith et al. |
| 2009/0313572 A1 | 12/2009 | Paek et al. |
| 2009/0313573 A1 | 12/2009 | Paek et al. |
| 2009/0327977 A1* | 12/2009 | Bachfischer et al. .......... 715/863 |
| 2010/0130236 A1* | 5/2010 | Sivadas et al. .............. 455/456.6 |
| 2010/0164897 A1 | 7/2010 | Morin |
| 2010/0289757 A1 | 11/2010 | Budelli |
| 2010/0315266 A1 | 12/2010 | Gunawardana et al. |
| 2011/0246575 A1 | 10/2011 | Murayama et al. |
| 2011/0270786 A1 | 11/2011 | Badger et al. |
| 2012/0019446 A1 | 1/2012 | Wu et al. |

OTHER PUBLICATIONS

Baudisch et al., "Phosphor: explaining transitions in the user interface using afterglow effects," *Proc. of the 19th Annual ACM Symposium on User Interface Software and Technology (UIST)*, pp. 169-178 (2006).

Brewster et al., "Tactile feedback for mobile interactions," *Proc. of the SIGCHI Conf. on Human Factors in Computing Systems*, pp. 159-162 (2007).

Brown et al., "Multidimensional Tactons for Non-visual Information Display in Mobile Devices," *Proc. of the 8th Conf. on Human-Computer Interaction with Mobile Devices and Services (MobileHCI)*, pp. 231-238 (2008).

Hoffmann et al., "TypeRight: A Keyboard with Tactile Error Prevention," *Proc. of the SIGCHI Conf. on Human Factors in Computing Systems*, pp. 2265-2268 (2009).

Hoggan et al., "Investigating the Effectiveness of Tactile Feedback for Mobile Touchscreens," *Proc. of the SIGCHI Conf. on Human Factors in Computing Systems*, pp. 1573-1582 (2008).

Kaaresoja et al., "Snap-Crackle-Pop: Tactile Feedback for Mobile Touch Screens," *Proc. of Eurohaptics*, pp. 565-566 (2006).

Kristensson, "Discrete and Continuous Shape Writing for Text Entry and Control," Ph.D. thesis, Linköping University, Sweden (2007) (215 pages).

Kristensson et al., "Relaxing Stylus Typing Precision by Geometric Pattern Matching," *Proceedings of the 10th Int'l Conf. on Intelligent User Interfaces (IUI)*, pp. 151-158 (2005).

Lee et al., "Haptic Pen: A Tactile Feedback Stylus for Touch Screens," *Proc. of the 17th Annual ACM Symposium on User Interface Software and Technology*, pp. 291-294 (2004).

Lee et al., "The Performance of Touch Screen Soft Buttons," *Proc. of the SIGCHI Conf. on Human Factors in Computing Systems*, pp. 309-318 (2009).

Lewis et al., "Task-Centered User Interface Design: A Practical Introduction," distributed via anonymous ftp (ftp.cs.colorado.edu) (1993) (190 pages).

Luk et al., "A Role for Haptics in Mobile Interaction: Initial Design Using a Handheld Tactile Display Prototype," *Proc. of the SIGCHI Conf. on Human Factors in Computing Systems*, pp. 171-180 (2006).

MacKenzie et al., "Eye Typing Using Word and Letter Prediction and a Fixation Algorithm," *Proc. of the ACM Symposium on Eye Tracking Research and Applications—ETRA 2008*, pp. 55-58 (2008).

MacKenzie et al., "Phrase Sets for Evaluating Text Entry Techniques," *CHI 2003—Extended Abstracts on Human Factors in Computing Systems*, pp. 754-755 (2003).

(56) References Cited

OTHER PUBLICATIONS

Paek et al., "Multimodal Feedback and Guidance Signals for Mobile Touchscreen Keyboards," Microsoft Research Technical Report MSR-TR-2010-76, Jun. 2010 (10 pages).
Paek et al., "A Practical Examination of Multimodal Feedback and Guidance Signals for Mobile Touchscreen Keyboards," *Proc. of the 12th Int'l Conf. on Human Computer Interaction (Mobile HCI 2010)*, pp. 365-368 (Sep. 2010).
Rabin et al., "Tactile Feedback Contributes to Consistency of Finger Movements During Typing," *Experimental Brain Research*, vol. 155, No. 3, pp. 362-369 (2004).
Shannon, "Prediction and Entropy of Printed English," *Bell System Technical Journal*, pp. 50-64 (Jan. 1951).
9TO5Mac, http://www.9to5mac.com/ipad-spell-check-thesaurus-4323967, 4 pages (document marked Feb. 10, 2010, downloaded on May 18, 2010).
Android Open Source Project, "Cupcake Development Branch," http://source.android.com/roadmap/cupcake, 5 pages (downloaded on May 18, 2010).
Apple Inc., "Introducing iPhone 3G," http://www.apple.com/iphone/, 1 page (downloaded on May 18, 2010).
Apple Inc., iPad User Guide, 145 pages (document marked 2010, downloaded on May 14, 2010).
Apple Inc., iPhone User's Guide, 130 pages, (document marked 2008, downloaded on May 14, 2010).
Beckett, "Undocumented Spell Check Features Found on the iPad/iPhone Alley," http://www.iphonealley.com/tips/undocumented-spell-check-features-found-on-the-ipad, 1 page, (document marked May 12, 2010, downloaded on May 14, 2010).
Chan, "HTC Hero: Software & HTC Sense review,", http://www.androidcentral.com/htc-hero-software-htc-sense-review, 16 pages (document marked Oct. 15, 2009, downloaded on May 18, 2010).
Chen et al., "An Empirical Study of Smoothing Techniques for Language Modeling," Harvard University Technical report TR-10-98, 63 pages (Aug. 1998).
Comfort Software Group, "Virtual On-Screen Keyboard for any Taste," http://hot-virtual-keyboard.com/, 1 page (document not dated, downloaded on Jan. 22, 2010).
Faraj et al., "BigKey: a virtual keyboard for mobile devices," Proc. Of Int'l HCI, pp. 3-10 (2009).
Goodman et al., "Language Modeling for Soft Keyboards," AAAI, 6 pages (Edmonton, Canada, 2002).
Goodman et al., "Language Modeling for Soft Keyboards," Microsoft Research Technical Report MSR-TR-2001-118, 9 pages (Nov. 28, 2001).
Goodman et al., "Language Modeling for Soft Keyboards," Proceedings of Intelligent User Interfaces 2002, pp. 194-195 (San Francisco, Jan. 13-16, 2002).
Goodman et al., "The State of the Art in Language Modeling [Emphasis on Machine Translation]," A tutorial presented at North American ACL, 134 pages (Seattle, 2000).
Goodman et al., "The State of the Art in Language Modeling," Tutorial Presented at AMTA, 140 pages (Tiburon, Canada, 2002).
Goodman, "A bit of Progress in Language Modeling Extended Version," Microsoft Research Technical Report MSR-TR-2001-72, 73 pages (Aug. 2001).
Goodman, "Exponential priors for Maximum Entropy Models," North American ACL, 8 pages (2004).
Goodman, "Language Models for Handwriting," International Workshop on Frontiers in Handwriting Recognition 2006, 63 pages (2006).
Goodman, "Putting it all together: Language Model Combination," ICASSP-2000, 4 pages (Istanbul, Jun. 2000).
Grothaus, "iPhone OS 4.0: iPad-like spell check," the Unofficial Apple Weblog, http://www.tuaw.com/2010/04/08/iphone-os-4-0-ipad-like-spell-check/, 12 pages (document marked Apr. 8, 2010, downloaded on May 18, 2010).
Gunawardana et al., "Usability Guided Key-Target Resizing for Soft Keyboards," Proc. of the 14th Int'l Conf. on Intelligent User Interfaces, pp. 111-118 (Hong Kong, Feb. 7-10, 2010).

iPadMe.Org, "Your latest iPad News and Technology Released Here," http://ipadme.org/get-the-apple-wireless-keyboard/, 4 pages (document marked Apr. 17, 2010, downloaded on May 18, 2010).
Katysovas, "A first look at Google Android," Free University of Bolzano, Internet Technologies 2, 28 pages (Jan. 19, 2008).
Kölsch et al., "Keyboards without Keyboards: A Survey of Virtual Keyboards," University of California, Santa Barbara Technical Report 2002-21, 8 pages (Jul. 12, 2002).
Mackenzie et al., "Text entry using soft keyboards," Behaviour & Information Technology, vol. 18, No. 4, pp. 235-244 (1999).
Magnien et al., "Mobile text input with soft keyboards: optimization by means of visual clues," Proc. of MobileHCI, pp. 337-341 (2004).
Malaysia Mobile Tech News, "Review: HTC Hero—Software [Updated]," 42 pages, (document marked Sep. 17, 2009, downloaded on Apr. 12, 2010).
Masui, "An Efficient Text Input Method for Pen-based Computers," Proceedings of the ACM Conference on Human Factors in Computer Systems, pp. 328-335 (Apr. 18-23, 1998).
Masui, "POBox: An efficient text input method for handheld and ubiquitous computers," Lecture Notes in Computer Science, vol. 1707, pp. 288-300 (H. Gellersen, ed. 1999).
Microsoft Corp., "Microsoft Technet: Resources for IT Professionals," http://technet.microsoft.com/en-us/library/ee692902(printer).aspx, 5 pages (document marked 2010, downloaded on May 18, 2010).
Microsoft Corp., "Type without using the keyboard (On-Screen Keyboard)," http://windows.microsoft.com/en-US/windows7/Type-without-using-the-keyboard-On-Screen-Keyboard, 3 pages (document marked 2010, downloaded on May 18, 2010).
Miniman, "Windows Phone 7 Series: Two cool Keyboard Features," http://pocketnow.com/software-1/windows-phone-7-series-two-cool-keyboard-features, 3 pages (document marked Feb. 15, 2010, downloaded on May 18, 2010).
Paek et al., "Designing Phrase Builder: A Mobile Real-Time Query Expansion Interface," MobileHCI'09, 10 pages (Bonn, Germany, Sep. 15-18, 2009).
PDAMedia.biz, PDAmedia Keyboard V 2.0 user manual, 20 pages (Nov. 25, 2004).
Potter, et al., "Improving the Accuracy of Touch Screens: An Experimental Evaluation of Three Strategies," Proc. of CHI, pp. 27-32 (1988).
Redmond Pie, "Zune HD 4.3 Firmware Brings Support for Apps and 3D Games," http://www.redmondpie.com/zune-hd-4.3-firmware-brings-support-for-apps-and-3d-games-9140088/, 6 pages (document marked Nov. 7, 2009, downloaded on May 18, 2010).
SmartCell Technology, TextPlus™ for Windows Mobile (Pocket PC), Version 1.1, Users Guide, 18 pages (document marked 1999-2005).
Technology and Integration, "Eurovocs Suite, A useful typing aid," 2 pages (document not dated, downloaded Jan. 22, 2010).
techshout.com, "Sony Ericsson builds-in Zi's eZiType Technology in the M600 Phone," http://www.techshout.com/mobile-phones/2006/28/sony-ericsson-builds-in-zis-ezitype-technology-in-the-m600-phone/, 2 pages (document marked May 28, 2006).
Verizon/Google™, Droid User Guide, Manual No. 68000202474-B, 58 pages (document marked 2010, downloaded on May 14, 2010).
Hinrichs, "Examination of text-entry methods for tabletop displays," 2nd IEEE International Workshop on Horizontal Interactive Human-Computer Systems, Tabletop 2007, Oct. 10-12, 2007, pp. 105-112.
MacKenzie et al., "Text entry for mobile computing: Models and methods, theory and practice," Human-Computer Interaction, 2002, vol. 17, pp. 147-198.
Rajeshkannan et al., "Language localization for mobile phones," Proc. Of the Conf. on Mobile and Pervasive Computing, CoMPC 2008, Aug. 7-8, 2008, pp. 52-55.
Sirisena, "Mobile text entry," Department of Computer Science, University of Canterbury, Christchurch, New Zealand, Nov. 8, 2002, pp. 1-41.
Soukoreff et al., "Theoretical upper and lower bounds on typing speed using a stylus and a soft keyboard," Behaviour & Information Technology, vol. 14, No. 6, 1995, pp. 370-379.

* cited by examiner

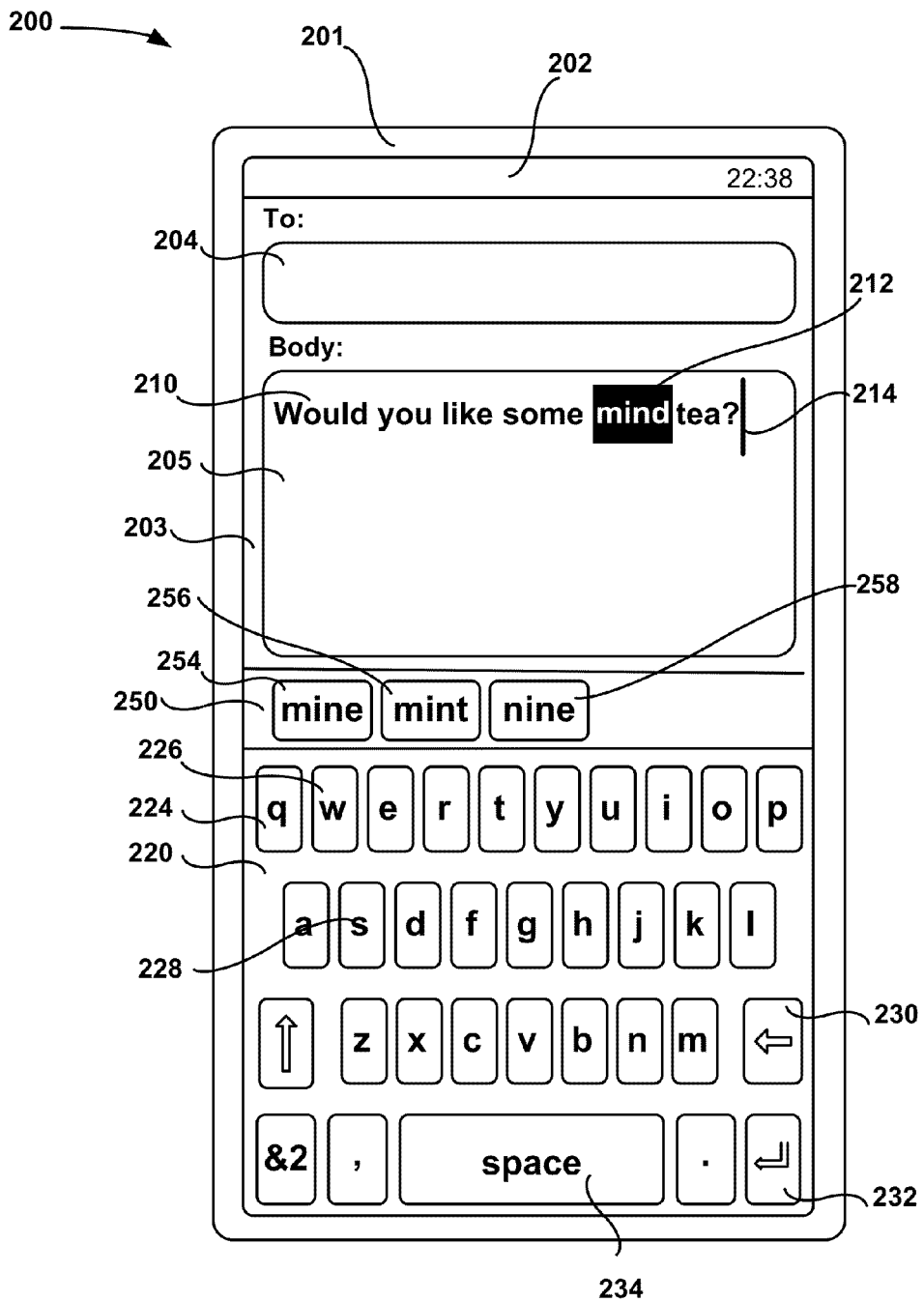

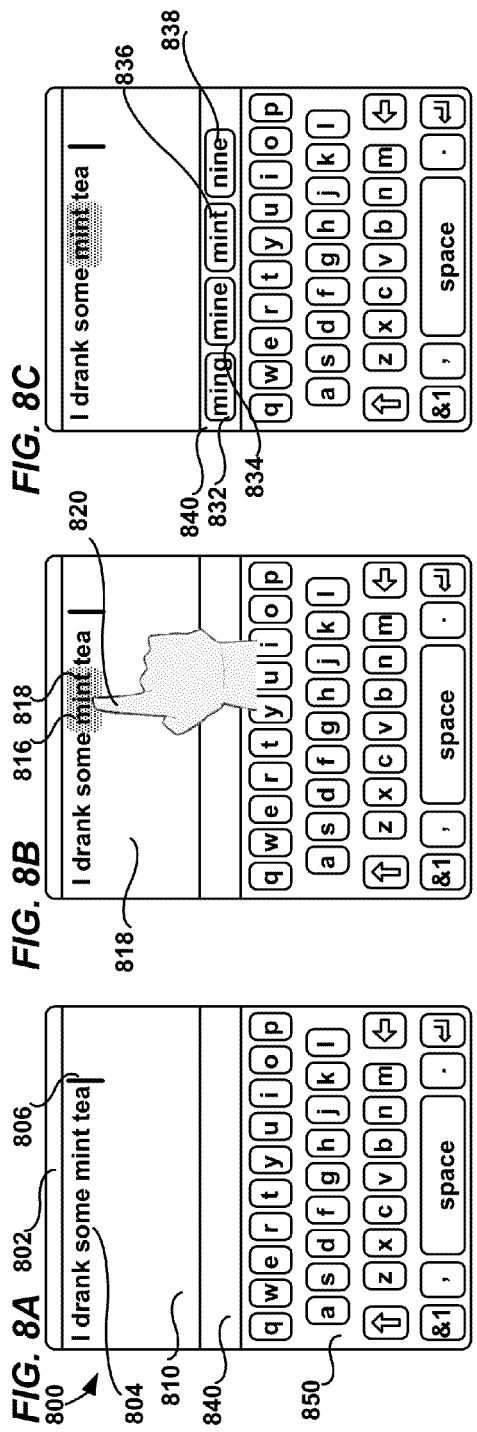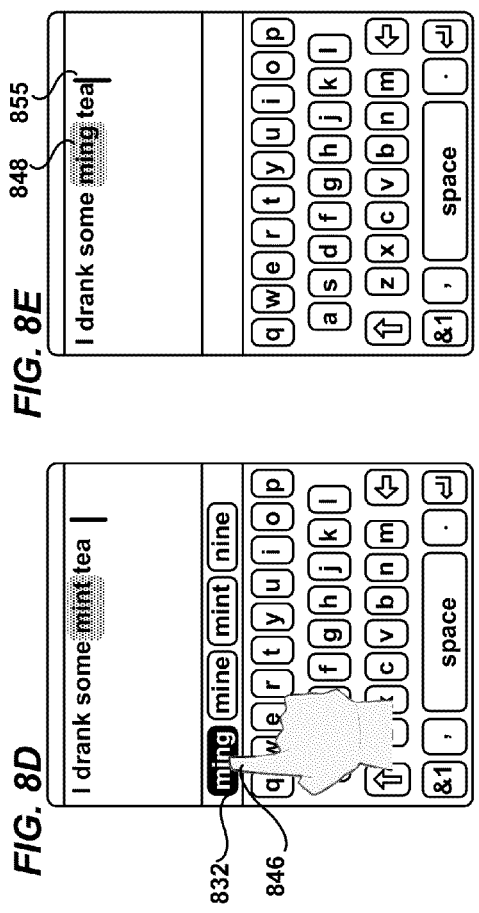

FIG. 10A

Edit Distance = 3 applicaiotn → applicatotn
applicatotn → applicatitn
applicatitn → application

1000

Edit Distance = 2 applicatoin → applicatiin
applicatiin → application

1004

Edit Distance = 1 applicaton → application

| System dictionary probability | | Text input | | | |
|---|---|---|---|---|---|
| | | mement | momentos | momement | mementos |
| Dictionary probability | memento | 0.40 | 0.40 | 0.00 | 0.10 |
| | moment | 0.30 | 0.10 | 0.20 | 0.00 |
| | mementos | 0.30 | 0.50 | 0.00 | 0.85 |
| | movement | 0.00 | 0.00 | 0.50 | 0.00 |
| | momentous | 0.00 | 0.00 | 0.10 | 0.00 |
| | moments | 0.00 | 0.00 | 0.10 | 0.05 |
| | moment's | 0.00 | 0.00 | 0.10 | 0.00 |

| User dictionary probability | | Text input | | | |
|---|---|---|---|---|---|
| | | mement | momentos | momement | mementos |
| Dictionary probability | memento | 0.00 | 0.00 | 0.00 | 0.10 |
| | moment | 0.30 | 0.10 | 0.20 | 0.00 |
| | mementos | 0.00 | 0.00 | 0.00 | 0.85 |
| | movement | 0.00 | 0.00 | 0.50 | 0.00 |
| | momentous | 0.00 | 0.00 | 0.10 | 0.00 |
| | moments | 0.60 | 0.90 | 0.10 | 0.05 |
| | moment's | 0.00 | 0.00 | 0.10 | 0.00 |

| Penalty Category | Input Word | Candidate Word |
|---|---|---|
| Insertion | wrd | word |
| Wildcard | word's | words |
| Deletion | worrd | word |
| Transposition | wrod | word |
| Non-fuzzy substitution | woid | word |
| Fuzzy substitution | wprd | word |
| Case change | mrs | Mrs |
| Accent | cafe | café |

(Hit target resizing disabled)

(Hit target resizing enabled – input data "kno")

(Hit target resizing enabled – input data "for")

USER-CENTRIC SOFT KEYBOARD PREDICTIVE TECHNOLOGIES

CROSS REFERENCE TO RELATED APPLICATION

This application claims the benefit of U.S. Provisional Application No. 61/304,341, filed Feb. 12, 2010, the disclosure of which is incorporated herein by reference in its entirety.

FIELD

The present disclosure pertains to devices and methods for enhancing text entry using a touch screen device.

BACKGROUND

With the increasing popularity of mobile devices, including cellphone devices, handheld devices, handheld computers, smartphones, PDAs, etc., there is a need for improving the user interface experience by increasing user text input speed, reducing text entry errors, and improving the overall user experience.

Mobile devices with capacitive or resistive touch capabilities often utilize a touch screen keyboard, a hardware keyboard, speech recognition, handwriting recognition, or combination of the four, for entry of text input. Touch screen keyboards enable larger displays for videos, web pages, email, etc., without the requirement of a physical keyboard. Because touch screen keyboards are software-based, they can be easily adjusted for different languages, touch screen orientation, and key layouts. Furthermore, touch screen keyboards can be augmented with widgets for word prediction and disambiguation candidates.

Users of devices with touch screens, especially mobile devices, have varying abilities and styles of entering text. A particular user may tend to use certain words, including words not found in a system dictionary, more or less frequently depending on the input scope. For example, the frequency of word usage used may vary depending on whether the input scope is a message body, subject lines, or to/from fields. Similarly, the frequency of word usage or typing accuracy may also vary between individual users. Therefore, there exists ample opportunity for improvement in technologies related to facilitating user input on electronic devices by learning user tendencies when entering text in order to accelerate user text entry and reduce user input error rates while taking into account input scope and the completion state of a given text entry.

SUMMARY

An apparatus and method are disclosed for providing feedback and guidance to touch screen device users to improve the text entry user experience and performance.

The described techniques and tools for solutions for improving text entry user experience and performance can be implemented separately, or in various combinations with each other. As will be described more fully below, the described techniques and tools can be implemented on hardware that includes software touch screen keyboards or hardware keyboards. As will be readily apparent to one of ordinary skill in the art, the disclosed technology can be implemented using various platforms coupled with a touch screen including, but not limited to, mobile devices (cellphones, smartphones, PDAs), tablet or laptop computers, desktop computers, and home theater systems. As used herein, a touch screen includes a display coupled with touch sense capabilities (for example, displays using capacitive or resistive sensors).

According to a first embodiment, a method comprises receiving first input data, automatically learning user tendencies based on the first input data to generate input history data, receiving second input data, and based on the input history data and the second input data, generating auto-corrections or suggestion candidates for the second input data. In some examples, the receiving first input data comprises receiving a completion event indicating that the first input data is complete, such as the sending of a text message, instant message, or email. In some examples, the automatically learning user tendencies comprises analyzing user-specific web content associated with the user. In some examples, the input history data can include touch position data, data representing the last time a word of the first input data was used, typing speed data, or data representing the orientation of a touch screen while receiving data.

In some examples, some or all of the receiving first input data and second input, automatically learning user tendencies, and generating auto-corrections or suggestion candidates can occur in a cloud. In some examples, the receiving second input data includes resizing one or more target areas associated with one or more associated keys on a touch screen keyboard based on one or more characters previously received in the second input data, one or more characters of the second input data are determined at least in part using the resized target areas. In some examples, resizing the one or more target areas includes using a generic touch model based on previously-collected touch screen keyboard typing data for plural users, the generic touch model including one or more child probability scores for one or more input data sequences for the typing data.

According to a second embodiment, a method comprises receiving first input data comprising one or more words and associated with an input scope of a mobile device, automatically learning user tendencies using the first input data to generate user-specific input history data, receiving second input data from a touch screen keyboard; analyzing the second input data and at least a portion of the user-specific input history data, and based on the analyzing, providing one or more user-specific auto-corrections or suggestion candidates for the second input data to the touch screen keyboard.

In some examples, the user-specific input history data includes data indicating that at least one input word of the first input data was previously auto-corrected and the auto-correction was undone. In some examples, the user-specific auto-corrections comprise suppressing an auto-correction based on comparing a threshold value to a score generated by combining first data comprising a weighted probability based on one or more candidate sources with second data comprising a weighted edit distance based on one more edit distance penalty categories. In some examples, the analyzing comprises combining a weighted probability for at least one of the words based on one or more candidate sources with a weighted edit distance based on one or more edit distance penalty categories and at least one of the one or more candidate sources is based on user-specific input history data.

In some examples, receiving second input data includes resizing one or more target areas associated with one or more associated keys on the touch screen keyboard based on one or more characters previously received in the second input data, and the resizing can be based at least in part on the user-specific input history data.

In some examples, some or all of the receiving first input data and second input, automatically learning user tendencies, and generating auto-corrections or suggestion candidates can occur in a cloud.

According to a third embodiment, a computer-readable storage device stores computer-readable instructions that when executed cause a computer to perform a method comprising using a touch screen keyboard coupled with a mobile device, receiving first user input data associated with an input scope, the first user input data comprising one or more characters, receiving a completion event associated with the input scope using the text entry device, after the receiving, automatically analyzing the first user input data and storing user-specific input history data including an indication of the input scope based on the analyzing, using the touch screen keyboard, receiving second user input data, determining a weighted probability determined from one or more candidate source data selected from a group including at least one of the following: the user-specific input history data, the second user input data, dictionary probability data, user-specific touch model data, and generic touch model data, determining a weighted edit distance determined by calculating one or more edit distances selected from a group of penalty categories including at least one of the following: insertion, deletion, transposition, non-fuzzy substitution, fuzzy substitution, case change, and accent, automatically determining one or more suggestion candidates based on a score determined by combining the weighted probability and the weighted edit distance, and displaying the suggestion candidates on the touch screen keyboard.

Some embodiments include a computer-readable storage device storing instructions that when executed cause a computer to perform one or more of the methods disclosed herein.

Some embodiments include a system for performing one or more of the method disclosed herein. In some examples, the system can include a computing cloud.

The foregoing and other objects, features, and advantages of the invention will become more apparent from the following detailed description, which proceeds with reference to the accompanying figures.

BRIEF DESCRIPTION OF THE DRAWINGS

FIG. 2 depicts a first embodiment of a mobile device, including a touch screen keyboard, suggestion candidates area, and text entry areas.

FIGS. 8A-8E depict a method of presenting a previously learned word as a suggestion candidate in an embodiment of the disclosed technology.

FIG. 10A depicts three examples of calculating an edit distance between two words.

FIG. 10B depicts several entries in a system dictionary probability table.

FIG. 10C depicts several entries in a user dictionary probability table.

DETAILED DESCRIPTION

Figure 1:
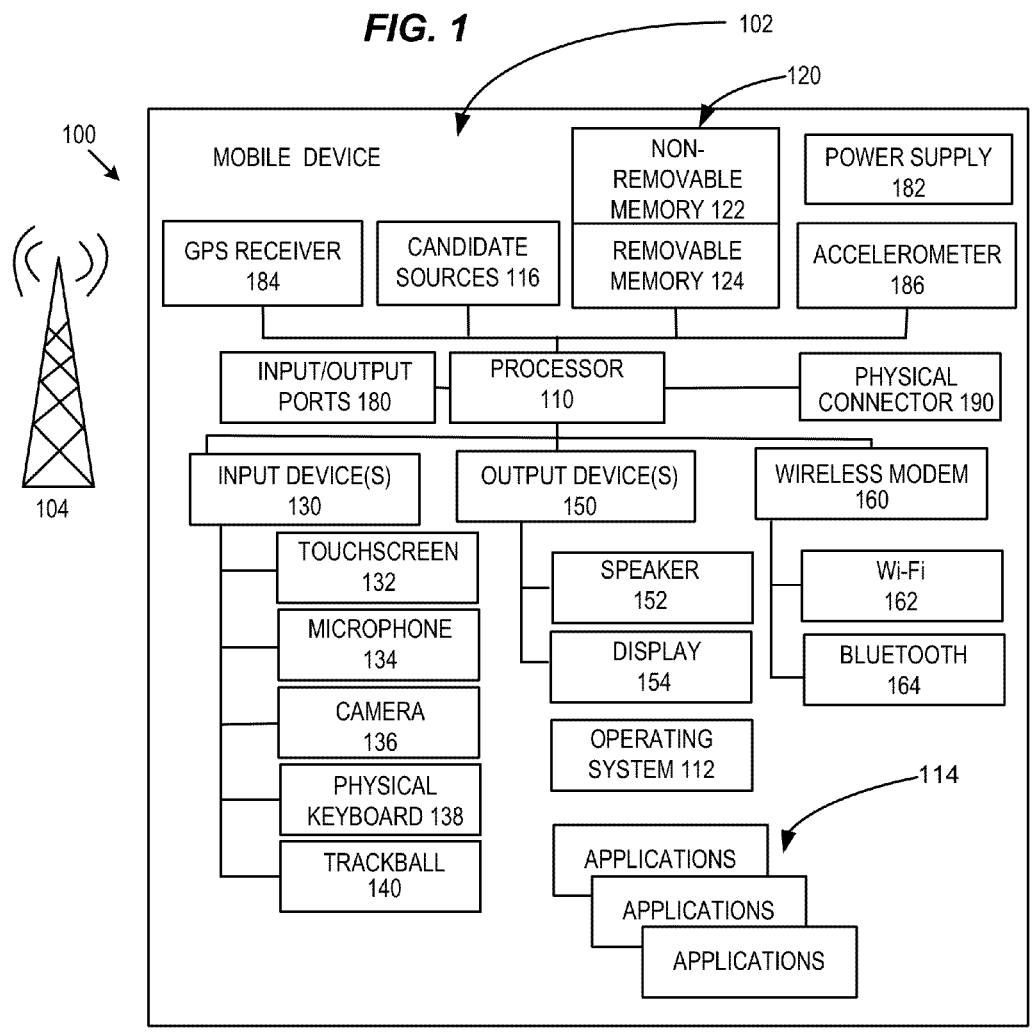
FIG. 1 is a block diagram illustrating a mobile device for an exemplary embodiment of the disclosed technology, including a touch screen and computer-readable storage media.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce," "generate," "select," "highlight," and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In the following description, certain terms may be used such as "up," "down," "upper," "lower," "horizontal," "vertical," "left," "right," "over," "on," "near," and the like. These terms are used, where applicable, to provide some clarity of description when dealing with relative relationships. But, these terms are not intended to imply absolute relationships, positions, and/or touch screen orientations.

As used in this disclosure, the term "wait" may be used to describe the action a device takes while waiting for particular value or type of input before proceeding with a particular operation. This waiting should not be construed as limiting the device to only waiting for the particular type of input; rather, the device may receive other input or perform other actions concurrently with the waiting.

As used in this disclosure, the term "automatically" is used to describe actions that can proceed immediately, without receiving further user input. As used in this disclosure, the term "immediately" means that an action occurs within a short time period following a preceding action without needing to receive intervening user input. In some cases, there may be intervening actions performed between or concurrently with the preceding action and the action occurring "immediately," for example, screen refresh or redraw, sound playback, etc.

As used in this disclosure, the term "over" is used to describe the positioning of objects (for example, a finger, thumb, or stylus) over, on, or near a location on a touch screen. In some embodiments, this object need not come into contact with the touch screen for the object's position to be determined. In other embodiments, the object described as "over" the touch screen may be in contact with the surface of the touch screen. In some embodiments, the object determined to be "over" a location of the touch screen may not actually be positioned directly over the touch screen location, but determined to be "over" the location on the touch screen, for example, by a position correction module of the text entry device or touch screen.

The disclosed technology includes various approaches to improving typing accuracy or typing speed when using devices having a touch screen by using suggestion candidates to augment other input devices. These suggestion candidates are typically represented in a candidates area, which need not be permanently reserved for that purpose, or can appear in varying location on the touch screen. After entering one or more words to form a text entry, the user can review the text entry by viewing the touch screen and deciding whether to select a word for suggestions. Once the user has selected the word, one or more suggestion candidates are displayed on the touch screen. In some embodiments, the suggestion candidates are presented as buttons, which include a word related to the word selected by the user. Suggestion candidates can be determined to be related to the selected word using a candidate generation module, which can use candidate sources including: a dictionary, a thesaurus, a common speller application programming interface (CSAPI), an input history data source (IHDS), or other methods, to determine suggestions. The user reviews the suggestion candidates, and selects one of the candidates for replacement using a single touch screen input over the desired suggestion candidate on the touch screen.

As used in this disclosure, a single touch screen input refers to the input received when a user positions an object over the surface of a touch screen such that the touch screen device can determine the position of the object. In some embodiments, the object can be the user's finger or thumb. In other embodiments, the object can be a stylus or puck. In some embodiments, the single touch screen input is received after the user "taps" the touch screen over a word or suggestion candidates. In other embodiments, the single touch screen input is received when the user presses the screen with a finger, thumb, or stylus. When a touch is detected over a touch screen surface, touch position data is generated. Receiving touch position data for a single touch screen input is sufficient to determine which word or which suggestion candidate the user is indicating on the touch screen—no additional keyboard input, mouse input, trackball input, voice input, or additional touches are necessary. Using a single touch screen input to determine user selections simplifies the input process and allows for the fast correction of text entries without the need to use submenus, popup menus, or additional input devices.

I. Example Mobile Device

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The memory 120 can also be used for the candidate sources 116, which are used for generating and suppressing autocorrections and generation suggestion candidates. Candidate sources 116 can include but are not limited to: a system dictionary, a user dictionary, a common speller application programming interface (CSAPI), touch models, and an input history data source.

The mobile device 100 can support one or more input devices 130, such as a touch screen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touch screen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added.

Figure 16:
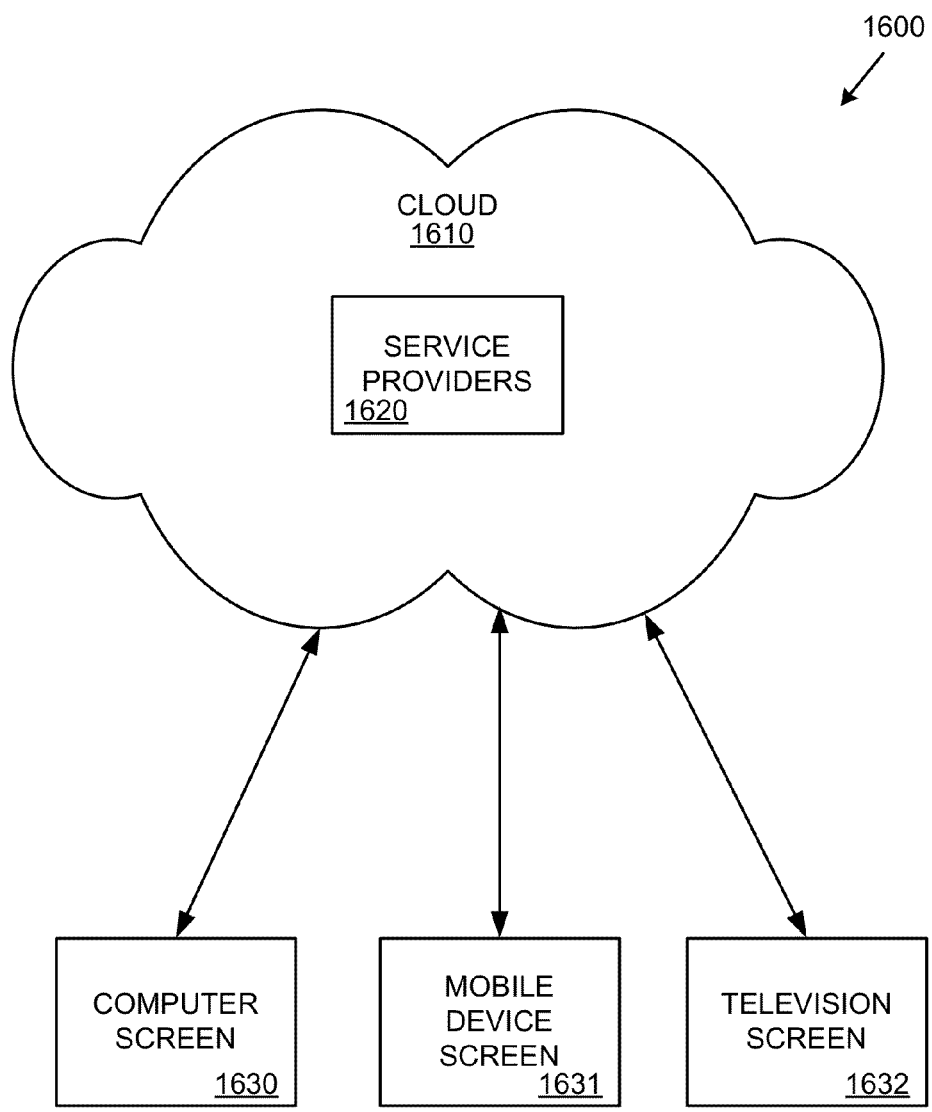
FIG. 16 is a block diagram illustrating a computing environment for an exemplary embodiment of the disclosed technology, comprising plural touch screens and a computing cloud.

FIG. 16 illustrates a generalized example of a suitable implementation environment 1600 in which described embodiments, techniques, and technologies may be implemented.

In example environment 1600, various types of services (e.g., computing services) are provided by a cloud 1610. For example, the cloud 1610 can comprise a collection of computing devices, which may be located centrally or distributed, that provide cloud-based services to various types of users and devices connected via a network such as the Internet. The implementation environment 1600 can be used in different ways to accomplish computing tasks. For example, some tasks (e.g., processing user input and presenting a user interface) can be performed on local computing devices (e.g., connected devices 1630-1632) while other tasks (e.g., storage of data to be used in subsequent processing, including candidate sources) can be performed in the cloud 1610.

In example environment 1600, the cloud 1610 provides services for connected devices 1630-1632 with a variety of screen capabilities. Connected device 1630 represents a device with a computer screen (e.g., a mid-size screen). For example, connected device 1630 could be a personal computer such as desktop computer, laptop, notebook, netbook, or the like. Connected device 1631 represents a device with a mobile device screen (e.g., a small size screen). For example, connected device 1631 could be a mobile phone, smart phone, personal digital assistant, tablet computer, and the like. Connected device 1632 represents a device with a large screen. For example, connected device 1632 could be a television screen (e.g., a smart television) or another device connected to a television (e.g., a set-top box or gaming console) or the like. One or more of the connected devices 1630-1632 can include touch screen capabilities. Devices without screen capabilities also can be used in example environment 1600. For example, the cloud 1610 can provide services for one or more computers (e.g., server computers) without displays.

Services can be provided by the cloud 1610 through service providers 1620, or through other providers of online services (not depicted). For example, cloud services can be customized to the screen size, display capability, and/or touch screen capability of a particular connected device (e.g., connected devices 1630-1632).

In example environment 1600, the cloud 1610 provides the technologies and solutions described herein to the various connected devices 1630-1632 using, at least in part, the service providers 1620. For example, the service providers 1620 can provide a centralized solution for various cloud-based services. The service providers 1620 can manage service subscriptions for users and/or devices (e.g., for the connected devices 1630-1632 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

II. Example Touch Screen Text Entry Device

FIG. 2 depicts a first embodiment 200 of a text entry device 201 having a touch screen 202. The touch screen 202 includes displays of a touch screen keyboard 220, a suggestion candidate area 250, and a text entry area 203. The touch screen 202 includes text entry area 203, which has a "To:" text entry field 204 and a "Body:" text entry field 205. The Body: text entry field 205 is shown displaying a phrase "Would you like some mind tea?" 210. The word "mind" in the phrase 210 is highlighted, indicating that "mind" is the selected word 212. A carat (cursor) 214 is also shown in the Body: text entry field 205. In some embodiments, the touch screen 202 has a substantially planar surface, and the display capability can be implemented using LED, LCD, electronic ink, DLP, Plasma, CRT, or other suitable display technology.

The text entry device 201 has a touch screen 202 that displays a touch screen keyboard 220 having several keys 224, 226, 228, 230, 232, 234, etc. Some of the keys, including the backspace key 230, return key 232, and space key 234 are also designated as delimiter keys. As shown, the touch screen keyboard displays the keys 224, 226, 228, 230, 232, 234, etc. as images on the touch screen 202, the touch screen including capacitive, resistive, inductive, or other suitable means for determining the position of one or more touch inputs detected over the surface of the keyboard and converting this touch input into text input. In some embodiments, the touch input is created using a stylus or puck, while in other embodiments the touch input can be created using a finger or thumb. In other embodiments, the touch screen keyboard 220 can be implemented as a hardware keyboard including with mechanical keys.

The touch screen 202 suggestion candidates area 250 is depicted in FIG. 2 showing three suggestion candidates "mine" 254, "mint" 256, and "nine" 258. As shown, the suggestion candidates area 250 includes widgets directly above the keyboard area containing word prediction and disambiguation candidates. Placing the suggestion candidates area 250 close to the touch screen keyboard 220 can improve typing speed and reduce errors by allowing users to maintain their focus of attention near the keyboard area while correcting a phrase 210 in the text entry area 203. In other embodiments, the suggestion candidates area 250 can be placed nearby the phrase 210 or selected word 212 in the text entry area 203.

The location of the text entry area 203, the keyboard 220, etc., can be varied based on the particular implementation and design.

III. Example Alternative Touch Screen Text Entry Devices

Figure 3A:
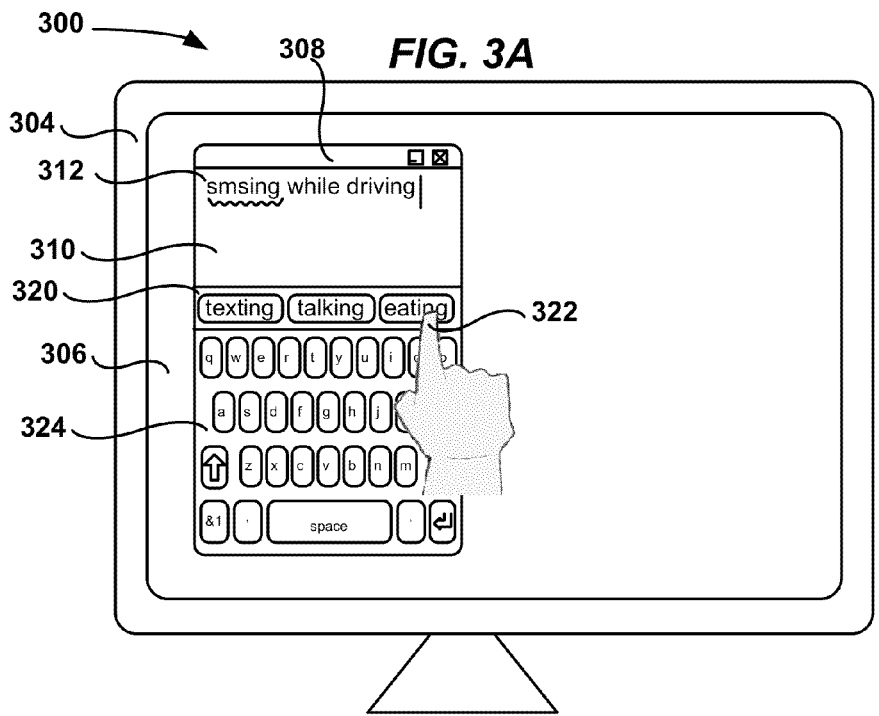
FIG. 3A depicts a second embodiment comprising a touch screen as a touch is made in a window, which includes a touch screen keyboard, candidates area, and text entry area.
Figure 3B:
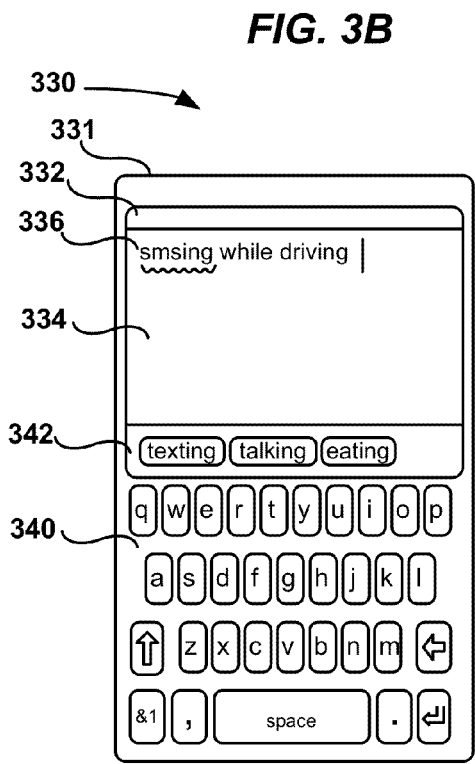
FIG. 3B depicts a third embodiment comprising a mobile device, including a hardware keyboard, a candidates area, and a text entry area.
Figure 3C:
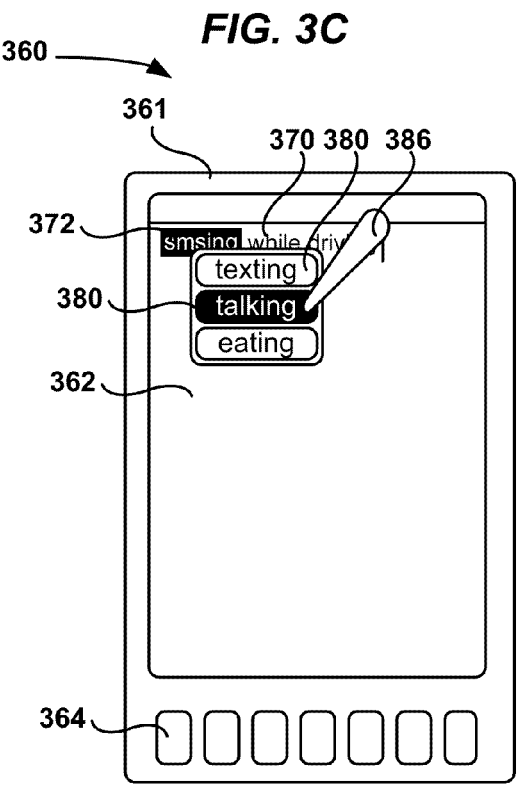
FIG. 3C depicts a fourth embodiment comprising a tablet device, including a touch screen, a candidates area, and a stylus.

FIGS. 3A-3C illustrate three additional embodiments 300, 330, 360 of the disclosed technology. FIG. 3A depicts an embodiment 300 of a text entry device, which is a touch screen device 304 having a touch screen 306 displaying a window 308 including a designated text entry area 310 displaying the phrase "smsing while driving" 312, candidates area 320, and touch keyboard 324. A finger 322 is shown selecting the candidate "eating" in the candidates area 320.

FIG. 3B depicts an embodiment 330 of a text entry device, which is a mobile device 331 having a touch screen 332 with a text entry area 334 (displaying the phrase "smsing while driving" 336), a suggestion candidates area 342, and a hardware keyboard 340.

FIG. 3C depicts an embodiment 360 of a text entry device, which is a tablet PC device 361 having a touch screen 362 and input keys 364. The touch screen 362 is shown displaying the phrase "smsing while driving" 370 and displaying the word 372 "smsing" as highlighted. Also shown is a suggestion candidates area 380 indicating that a candidate "talking" 382 has been selected. As shown, the user can use an input stylus 386 to create touch input that is received by the tablet PC device 361. In some embodiments of the disclosed technology, the text entry device is not limited to receiving text input using a touch screen keyboard, but can also use hardware keyboards, handwriting recognition, or speech recognition to receive text input.

IV. Example Method of Learning

Figure 4:
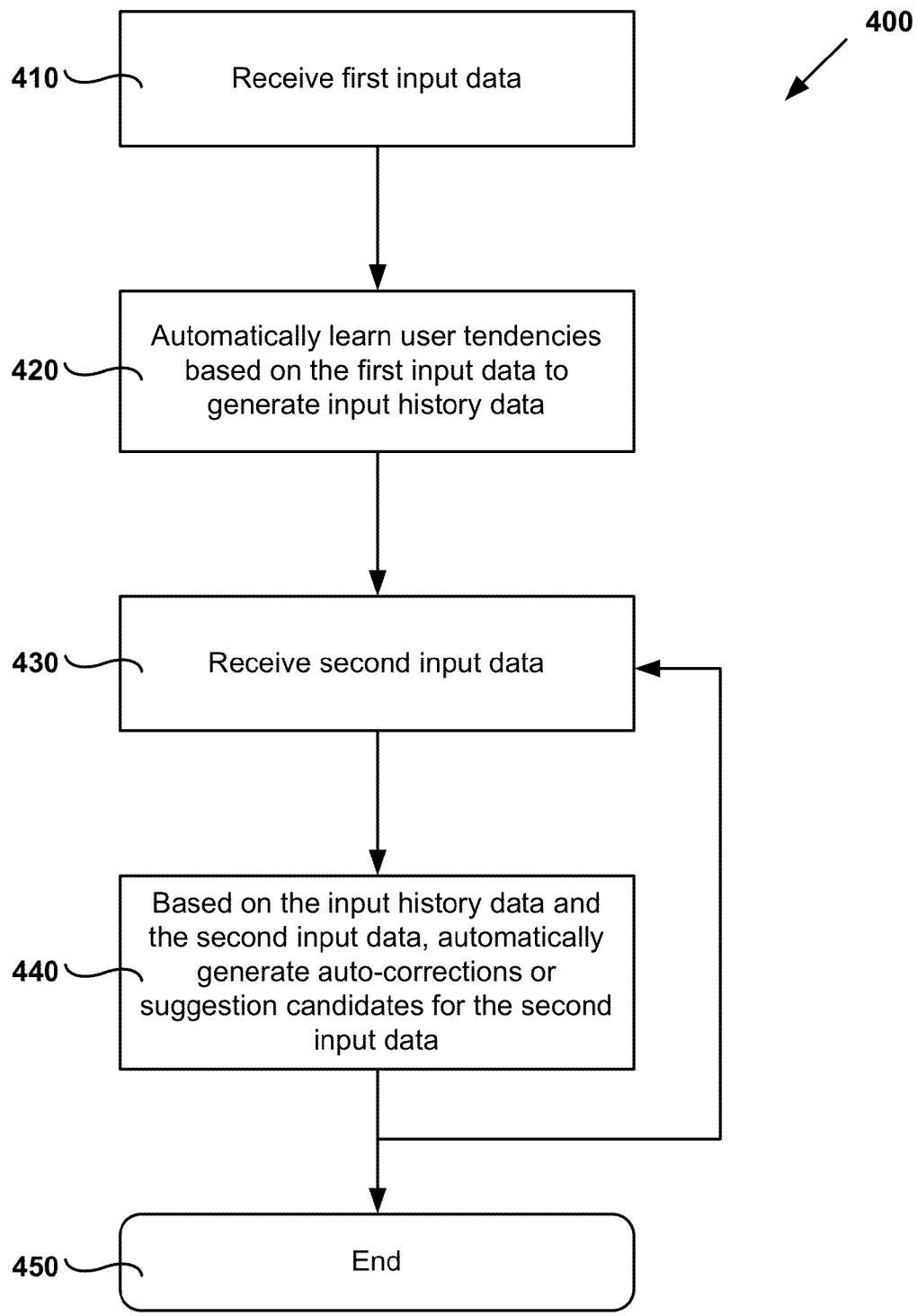
FIG. 4 is a flow chart that outlines a method of learning user tendencies for first input data and generating auto-corrections or suggestions for second input data based on the learning.

FIG. 4 is a flow chart 400 depicting process blocks for learning user tendencies and generating auto-corrections or suggestion candidates using the learned user tendencies. At process block 410, a text input device receives first input data from a source such as a touch screen keyboard, a hardware keyboard, a handwriting recognition module, or a speech recognition module. In some embodiments, the first input data includes text characters, text words, position data for key presses on a touch screen keyboard, typing speed data for one or more keystrokes received using a keyboard, correction data, and touch screen orientation data.

At process block 420, the text entry device analyzes the first input data to learn user tendencies and generates input history data based on the first input data that represents learned user tendencies. In some embodiments, the input history data includes a trigram, which comprises a word, a word preceding the word in the first input data, and a word subsequent to the word in the first input data. In some embodiments, the input history data includes data on word usage and input scope that one or more words have been used in. In some embodiments, the input history data includes key press position data, typing speed data, correction data, and touch screen orientation data.

At process block 430, the text entry device receives second input data from a source such as a touch screen keyboard, a hardware keyboard, a handwriting recognition module, or a speech recognition module.

At process block 440, the text entry device analyzes the second input data and one or more candidate sources, and determines if any auto-corrections should be made, or suggestion candidates should be presented, for the second input data. For example, if a system dictionary indicates that a word of the second input data should be designated as incorrect, the text entry device can automatically correct the word with another word from the system dictionary. As another example, if the input history data indicates that a word of the second input data should be designated as incorrect, the text entry device can automatically correct the word with another word from the input history data. As another example, if a system dictionary indicates that a word of the second input data should be designated as incorrect, the input history data can be used to determine that the word should be designated as acceptable, and therefore auto-correction or highlighting a word as incorrect can be suppressed. As another example, if a word is designated as incorrect, the input history data source can be used to rank candidates appearing the IHDS as more probable than candidates, or to generate candidates that appear in the IHDS but not in another candidate source. Thus, using candidates sources including a input history data source, the text entry device can automatically generate one or more suggestion candidates for the word using the input history data, and allow the user to select one of the suggestion candidates to replace the word designated as incorrect.

After generating suggestion candidates or generating auto-corrections for the second input data, the text entry device can either complete receiving second input data by proceeding to process block 450, or proceed to process blocks 430 and/or in order to receive additional second input data, or generate additional auto-corrections or suggestion candidates. Thus, as additional input data is received by the text entry device, additional auto-correction or suggestion candidates can be generated based on all of the second input data, or just the additional second input data. Process blocks 430 and 440 can be visited once or repeatedly in order to process any additional second input that is received.

V. Example Method of User-Specific Learning

Figure 5:
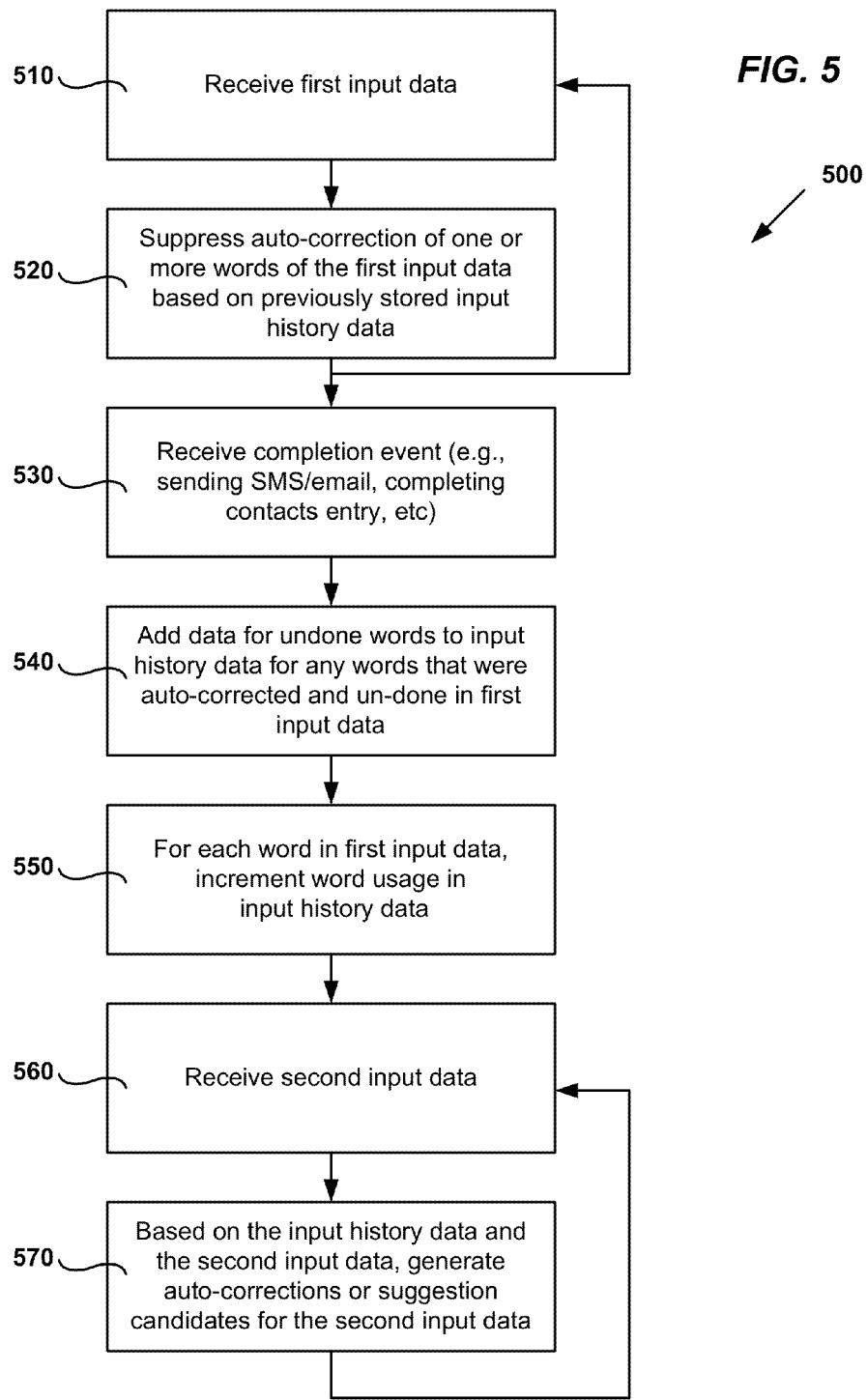
FIG. 5 is a flow chart of an exemplary implementation of the method shown in FIG. 4.

FIG. 5 is a flow chart 500 further detailing the method shown in FIG. 4. FIG. 5 depicts process blocks for learning user tendencies and generating auto-corrections or suggestion candidates using the learned user tendencies.

At process block 510, a text input device receives first input data from a source such as a touch screen keyboard, a hardware keyboard, a handwriting recognition module, or a speech recognition module. In some embodiments, the first input data includes text characters, text words, position data for key presses on a touch screen keyboard, typing speed data, correction data, and/or touch screen orientation data.

At process block 520, the first input data is analyzed and compared against previously generated input history data including word probability data, key probability data, edit distance data, touch model probability data, dictionary probability data, and/or input history data. Based on this analysis, auto-correction is suppressed for one or more words of the first input data that would otherwise have been designated as incorrect by not auto-correcting based on, for example, previously stored input history data. The acts of process blocks 510 and 520 can be repeated multiple times as more input data is added to the first input data.

At process block 530, a completion event is received. In some embodiments, a completion event can be a designated action performed with a text input device, for example, the act of sending an SMS text message, e-mail message, instant message (IM), adding a contact to an address book, or posting or receiving web content from a web page. Web content can include web queries, clicks, URLs, as well as content available via the Web such as social networking data (e.g., from Facebook, LinkedIn, MSN, etc. sites) and web directories.

After receiving a completion event, the method proceeds to process block 540, where the first input data is analyzed to determine any words of the first input history that were auto-corrected and then undone. For example, a user sending emails describing a delicious meal may intend to type the word "yummy" several times, but by default this word is auto-corrected to "tummy." The user then needs to undo these auto-corrections several times to enter the intended word "yummy." Thus, when analyzing the first input data at process block 540, these undone auto-corrections can be identified and data added to the input history data that represents these undone corrections.

At process block 550, for each word in the first input data, a usage count for each word can be incremented in the input history data. This data can be used to tailor subsequent auto-correction or suggestion candidate generation for a specific user. For example, a user enters "yummy" several times in the completed first input data and then sends messages, emails, or web posts. On subsequent entry of text input data, a score generated for "yummy" will be higher based on the high frequency usage of this word by the user, and thus subsequent auto-correction or suggestions will be less likely to correct the word "yummy." Thus, by tracking word usage, subsequent auto-corrections and suggestions can be more accurate and require less intervention to correct unwanted auto-corrections.

At process block 560, subsequent second input data is received. This second input data can be received using similar techniques as described for the first input data at process block 510.

At process block 570, the second input data and input history data are analyzed in order to generate auto-corrections or suggestion candidates for the second input data. These auto-corrections or suggestion candidates can be generated as a user enters the data, or upon receiving a designated completion event. Thus, input history data generated at, for example, process blocks 540 and 550 can be used to provide more accurate auto-corrections or suggestion candidates. Process blocks 560 can be visited once or repeatedly in order to process any additional second input data that is received.

VI. Example Method of Applying User-Specific Learning

Figure 6:
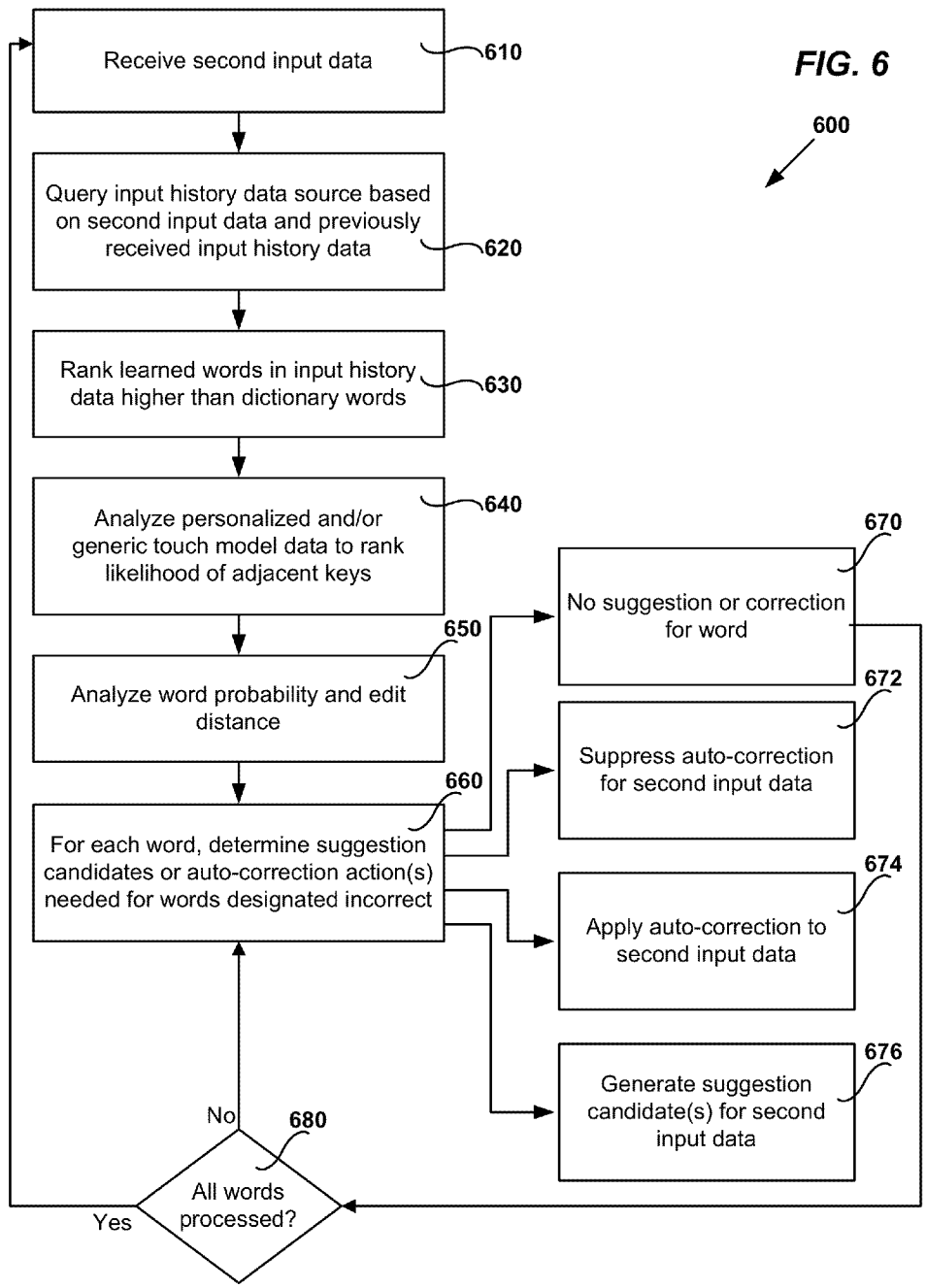
FIG. 6 is a flow chart that outlines another exemplary implementation of the method shown in FIG. 4.

FIG. 6 is a flow chart 600 further detailing the method shown in FIG. 4. FIG. 6 depicts process blocks for learning user tendencies and generating auto-corrections or suggestion candidates using the learned user tendencies. The acts of acquiring and learning input history data have already been performed, for either a specific or generic user.

At process block 610, second input data is received using similar techniques as described for receiving input data at process blocks 510 and 560 in FIG. 5.

At process block 620, previously generated input history data representing learned user tendencies is analyzed based on the second input data. In some embodiments, the analysis is based on the second input data and can also include: one or more words, one or more individual characters, position data of individual touch screen touches, and typing speed data.

At process block 630, results for the query are ranked based on whether the results are based on input history data or another source, such as a system or user dictionary. A higher score or rank can be applied for those results that are based on input history data. More detailed examples of applying a score or rank to query results are described below at, for example, FIGS. 9 and 10A-E and accompanying text.

At process block 640, generic and/or personalized touch model data is analyzed using a probability model to determine suggestions or auto-corrections for the second input data on a character or word basis. More detailed examples of applying a score or rank to query results are described below at, for example, FIG. 9 and accompanying text.

At process block 650, word probability and edit distance data are analyzed using a probability model to determine further suggestions or auto-corrections for the second input data on a word basis. More detailed examples of applying a score or rank to query results are described below at, for example, FIGS. 9, 10A-10E, and accompanying text.

At process block 660, the results of the analysis performed at process blocks 620, 630, 640, and/or 650 are combined in order to determine whether suggestion candidates or auto-corrections for one or more characters or words of the second input data should be generated. Based on this determination, the method proceeds to one of process blocks 670, 672, 674, or 676 for each word of the second input data.

At process block 670, based on the determination, no suggestions, auto-corrections or other modifications are made for the word in the second input data.

At process block 672, based on the determination, auto-correction is suppressed for the word, and an auto-correction that would have been performed on the second input data is not performed. For example, a word that is missing from one or more dictionaries would normally be auto-corrected, but because the word appears in the input history data, auto-correction is suppressed.

At process block 674, based on the determination for the word, auto-correction is applied to the word by replacing it with another word designated as correct.

At process block 676, one or more suggestion candidates are generated for a word of the second input data. These suggestion candidates can come from one or more of the analysis steps at, for example, process blocks 620, 630, 640, or 650. In some embodiments, the suggestion candidates can be immediately displayed to the user on the display of a mobile device. In other embodiments, the suggestion candidates are generated but not displayed until a user demands suggestion candidates for the word by, for example, making a touch input over the word on the display of the second input data. In some embodiments, an indication is provided for one or more words of the second input data that have suggestion candidates generated. In some embodiments, an indication is provided only for words that have been auto-corrected or do not appear in a dictionary, but suggestion candidates can still be generated and presented for words that do not have an indication by tapping on the word. For example, highlighting, an underline squiggle, audio feedback, or haptic feedback, can be used to indicate to the user that suggestion candidates are available for the word.

At process block 680, a determination is made whether all words of the second input data have been processed. If more words need to be processed, the method proceeds to process block 660. Otherwise, the method can proceed to process block 610, where further input data is received.

VII. Example Method of Undoing an Autocorrection

FIGS. 7A-7F depict a method 700 for receiving text input that is auto-corrected, and undoing the auto-correction using suggestion candidates. FIG. 7G is a flow chart 760 corresponding to the method 700 depicted in FIGS. 7A-7F.

Figure 7A:
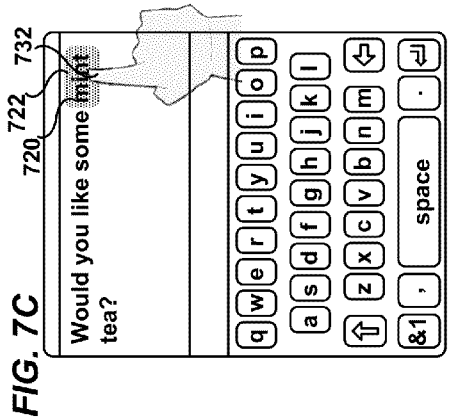
FIGS. 7A-7F depict a method of undoing an auto-corrected word and learning the undone word in an embodiment of the disclosed technology.

FIG. 7A depicts a mobile device 702 having a touch screen 710, a suggestion candidates area 740, and a keyboard 750. Using the keyboard 750, a user has typed a phrase "Would you like some ming" 704, and a carat (cursor) 706 is depicted after the phrase. The acts depicted in FIG. 7A correspond to process block 770 in the flow chart 760.

Figure 7B:
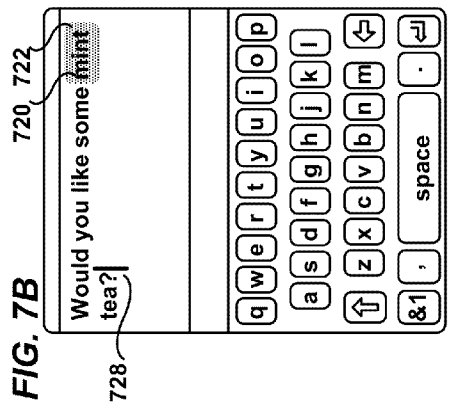

FIG. 7B depicts the mobile device 702 immediately after the user has typed the remainder of the phrase (adding "tea?") and auto-correction has been applied by the mobile device to the word "ming." As shown in FIG. 7B, the word "ming" has been replaced with the word "mint" 720, which is also highlighted with some shading 722 behind the word. The acts depicted in FIG. 7B correspond to process block 774 in the flow chart 760. As shown, the method can return to process block 770, and receive more first input data, or proceed to process block 778 if touch input is received over a word of the first input data.

Figure 7C:
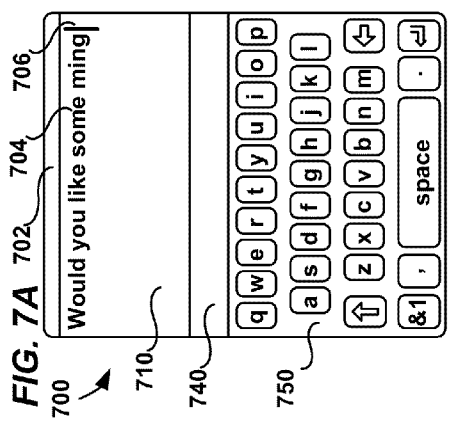
Figure 7D:
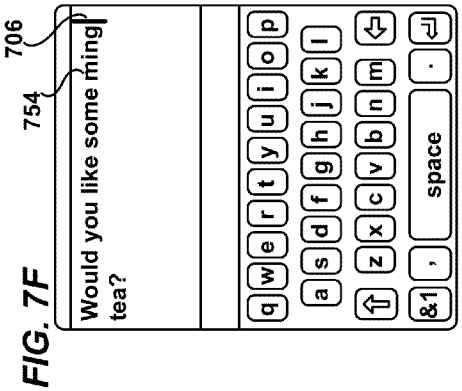

FIG. 7C depicts the mobile device 702 as the user uses a finger 732 to select the word "mint" 720. The acts depicted in FIG. 7C correspond to process block 778 in the flow chart 760. Turning to FIG. 7D, the mobile device 702 has changed the highlighting to solid behind the word "mint" 720. Further, the candidates area 740 now displays several suggestion candidates, including the words "ming" 742, "mine" 744, "mint" 746, and "nine" 748. The word "ming" 742 is provided as a suggestion candidate based on the word appearing in input history data because the word was previously entered by the user. Note that in some embodiments, words are not added to the input history data until after receiving a completion event. The words "mine" 744 and "nine" 748 are provided based on the words appearing in a system dictionary associated with the mobile device 702. The word "mint" 746 is provided so that the user can choose to keep the auto-corrected word. The acts depicted in FIG. 7D correspond to process block 780 in the flow chart 760.

Figure 7E:
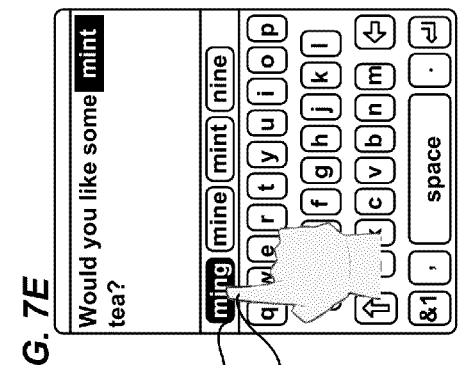

FIG. 7E depicts the mobile device 702 as the user uses a finger 752 to select the word "ming" 742, which appeared in the original input text. The acts depicted in FIG. 7D correspond to process block 784 in the flow chart 760.

Figure 7F:
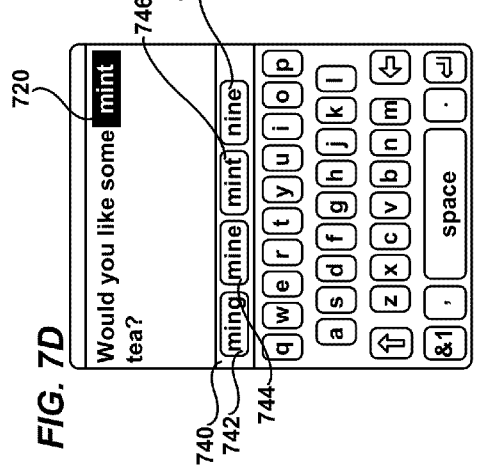
Figure 7G:
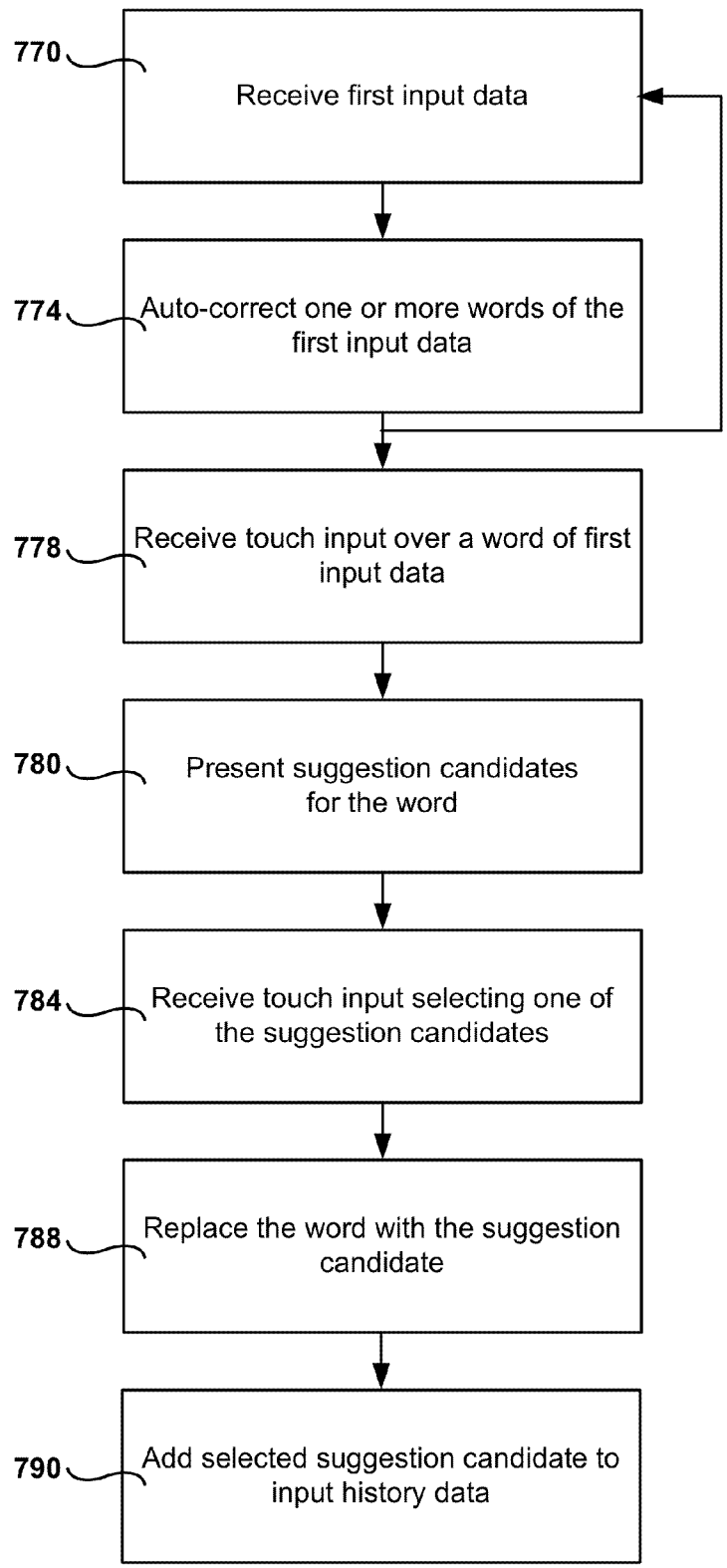
FIG. 7G is a flow chart that outlines the method shown in FIGS. 7A-7F.
Figure 8F:
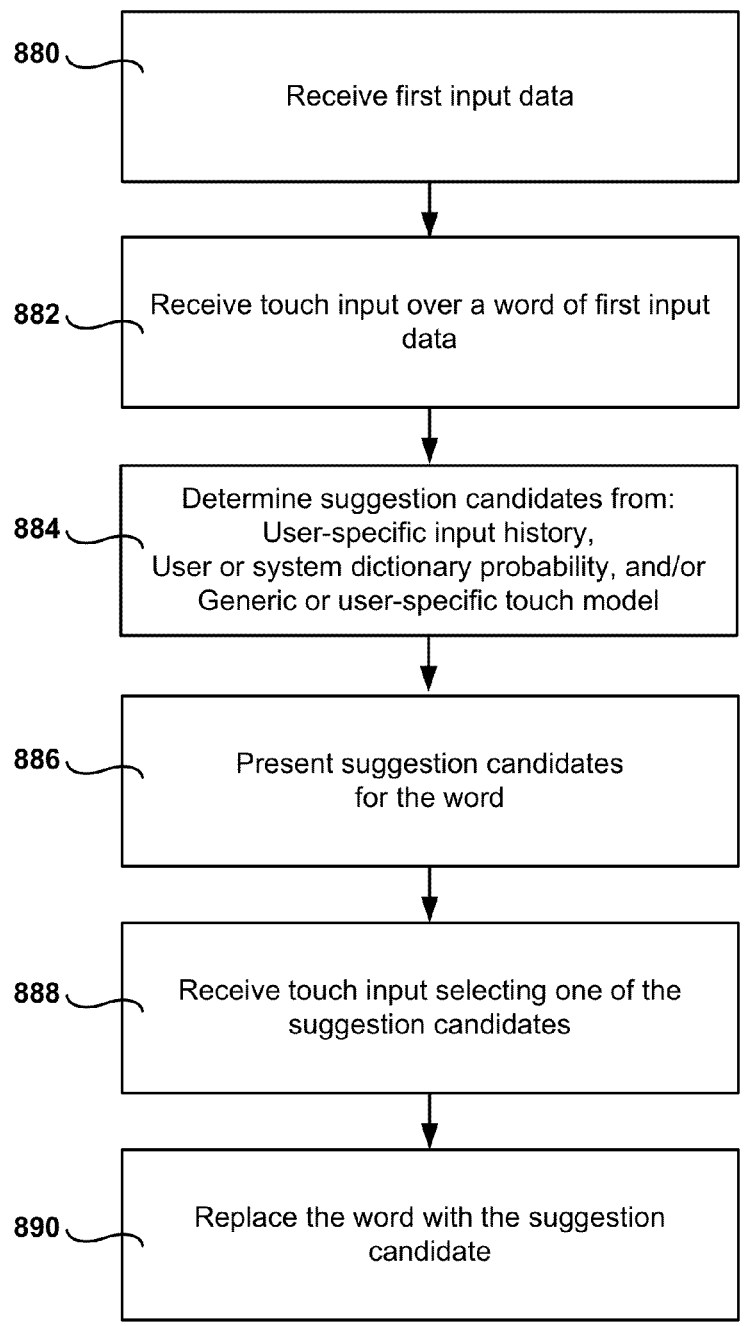
FIG. 8F is a flow chart that outlines the method shown in FIGS. 8A-8E.

Turning to FIG. 7F, the mobile device 702 has replaced the word "mint" with the original word ming "754." Further, the mobile device 702 learns the word "ming" by adding the word "ming" to the input history data, and also removes highlighting and places the carat 706 after the replaced word 754. The replacing and learning acts depicted in FIG. 7F correspond to process blocks 788 and 790 in the flow chart 760.

VIII. Example Method of Presenting Suggestion Candidates

FIGS. 8A-8E depict a method 800 for receiving text input providing suggestion candidates upon demand, including suggestion candidates based on previous input history data. FIG. 8F is a flow chart 860 corresponding to the method 800 depicted in FIGS. 8A-8E.

FIG. 8A depicts a mobile device 802 having a touch screen 810, a suggestion candidates area 840, and a keyboard 850. Using the keyboard 850, a user has typed a phrase "I drank some mint tea" 804, and a carat 806 is depicted after the phrase. The acts depicted in FIG. 8A correspond to process block 880 in the flow chart 860.

FIG. 8B depicts the mobile device 802 as the user selects the word "mint" 816 by providing a touch input over the word using a finger 820. As shown in FIG. 8B, the mobile device 802 has highlighted the word "mint" 816 by displaying some shading 818 behind the word. The acts depicted in FIG. 8B correspond to process block 882 in the flow chart 860.

After receiving the touch input, the method proceeds to process block 884, where suggestion candidates for the word "mint" 816 are determined using data from one or more sources, including user-specific input history data, user dictionary probability, system dictionary probability, a generic touch model, and/or a user-specific touch model.

FIG. 8C depicts the mobile device 802 after the word "mint" 816 is selected. As shown in FIG. 8C, the suggestion candidates area 840 now displays several suggestion candidates, including candidates associated with the words "ming" 832, "mine" 834, "mint" 836, and "nine" 838. The acts depicted in FIG. 8C correspond to process block 886 in the flow chart 860. As shown in FIG. 8C, the words for the suggestion candidates can come from several sources, including previous user input history data for "ming" 832, a system dictionary for "mine" 834 and "nine" 838, and the user's previous text input or a system dictionary for the word "mint."

FIG. 8D depicts the mobile device 802 receiving a single touch input as the user uses a finger 846 to select the suggestion candidate "ming" 832, which is highlighted to indicate the user's selection. The acts depicted in FIG. 8D correspond to process block 888 in the flow chart 860.

FIG. 8E depicts the mobile device 802 after the word "mint" is replaced with the word "ming" 848 associated with the selected suggestion candidate 832 and the carat 855 is placed after the replaced word. The acts depicted in FIG. 8E correspond to process block 890 in the flow chart 860.

IX. Example Method of Selecting Words from Multiple Sources

Figure 9:
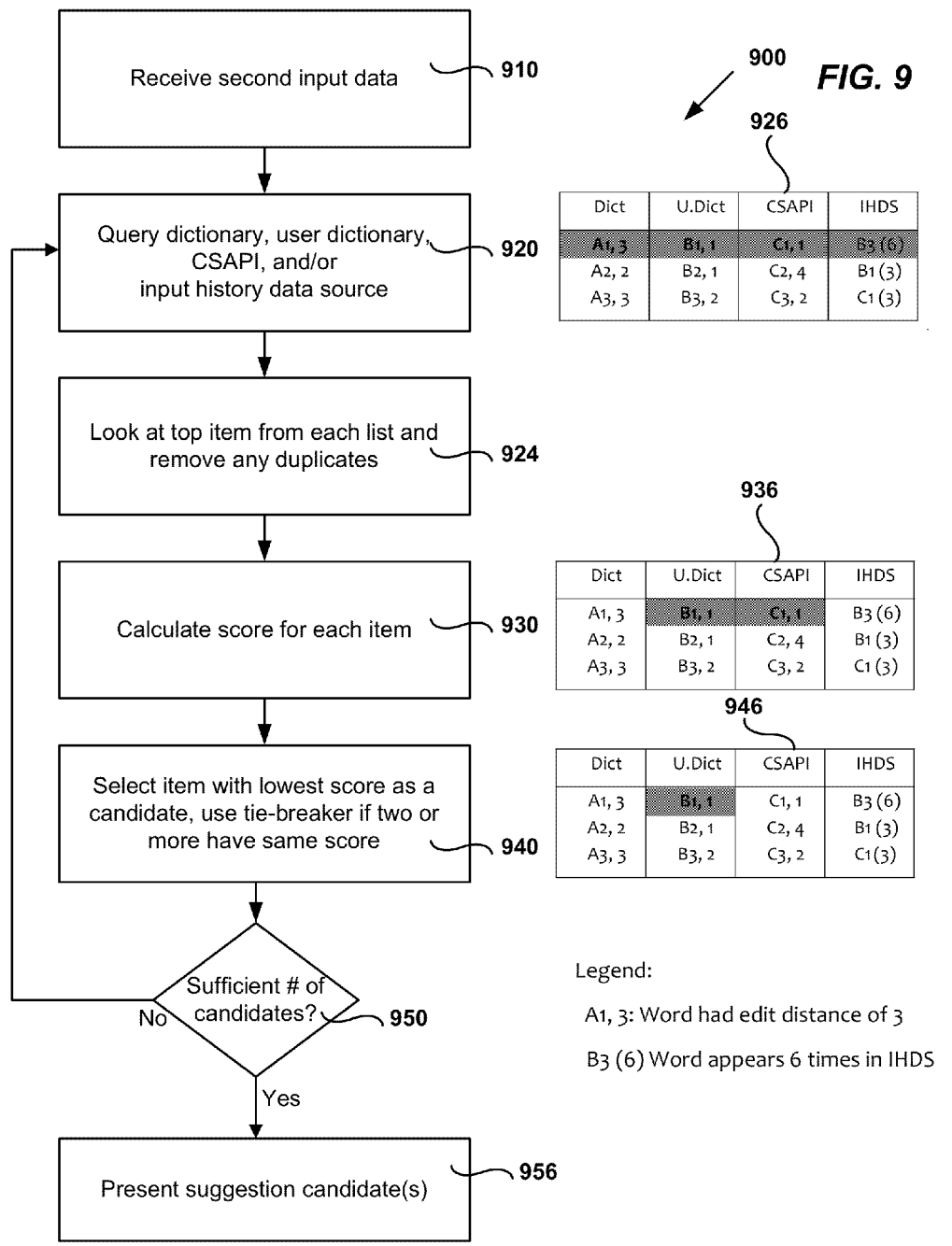
FIG. 9 is a flow chart that outlines a method of choosing one or more suggestion candidates from multiple candidate sources including an input history data source.

FIG. 9 is a flow chart 900 depicting process blocks for selecting suggestion candidates from multiple data sources including a system dictionary, a user dictionary, a common speller application programming interface (CSAPI) and an input history data source.

At process block 910, second input data is received using a mobile device. Previous input history data based on previously received input data is already stored in the input history data source. The second input data can be received from a source such as a touch screen keyboard, a hardware keyboard, a handwriting recognition module, or a speech recognition module. As shown, the second input data is handled on a per-word (instead of a per-character) basis.

At process block 920, the mobile device queries the data sources for one or more query words in the second input data. A representation of the results is shown in table 926, which has columns for (from left to right): system dictionary, user dictionary, CSAPI, and IHDS. Words are represented in the tables 926, 936, and 946 as symbols A1, A2, B2, etc. The best-scoring query result for each source is shown in the top row, i.e., the best-scoring result for the system dictionary is the word A1, the best-scoring result for the user dictionary is the word B1, and the best-scoring result for the IHDS is the word B3. For example, the best-scoring query for a source can be determined using a formula that assigns the best score to a word based on a combination that weights lower edit distances and higher usage frequency in a language model as better-scoring. The number after the comma next to each word represents the edit distance between the query word and the query result word. For example, word A1 has an edit distance of 3, while word B1 has an edit distance of 1. Also shown in the IHDS column is word usage data, e.g., the number of times the word has been previously used. As shown, the word B3 has been added to the IHDS 6 times, while word B1 has been added 3 times. In some embodiments, the IHDS is implemented similar to a priority queue, in that only the N most recent words added to the IHDS are maintained. For example, if N=1000, only the 1000 most recent IHDS additions are maintained, and any older entries are deleted as new entries are added to the IHDS.

At process block 924, the top item from each source is analyzed and any duplicate words are removed to produces a list of potential auto-correction or suggestion candidates. At process block 930, a score is calculated for each potential auto-correction or suggestion candidate. In some embodiments, this score is calculated using a fuzzy logic algorithm that looks at the probability of the query word being correct. In the embodiment shown, the score is calculated using the following equation:

$$\text{Score} = W_{Edit\ Distance} \times \text{Edit Distance} - W_{IHDS\ Count} \times \text{IHDS Count}$$

where $W_{Edit\ Distance}$ is a weight coefficient for the Edit Distance; Edit Distance is the number of edits needed to change the query result word to the query word; $W_{IHDS\ Count}$ is a weight coefficient for the IHDS Count; and IHDS Count is the number of times the word has been added to the IHDS. As indicated in table 936, word B1 and word C1 have a tie low score.

At process block 940, after a score has been calculated for each query result word, the query result word having the lowest score is selected. In the event of a tie, a tie-breaking step can be used; for example, the query sources can have a priority order such that words in the user dictionary are selected before the system dictionary or the CSAPI. As shown, the tie-breaking step results in word B1 being selected over word C1, which has the same score, because word B1 appears in the user dictionary.

At process block 950, the method determines whether there are sufficient suggestion candidates selected based on, for example, a designated number of candidates limit, or based on the amount of touch screen display space available for displaying suggestion candidates. If it is determined that a sufficient number of candidates have been selected, the method proceeds to process block 956, where the suggestion candidates are displayed to the user, and further processing can occur as described above. If sufficient candidates have not yet been selected, the method proceeds to block 920, and where the data sources are queried again to generate more suggestion candidates.

Figure 10D:
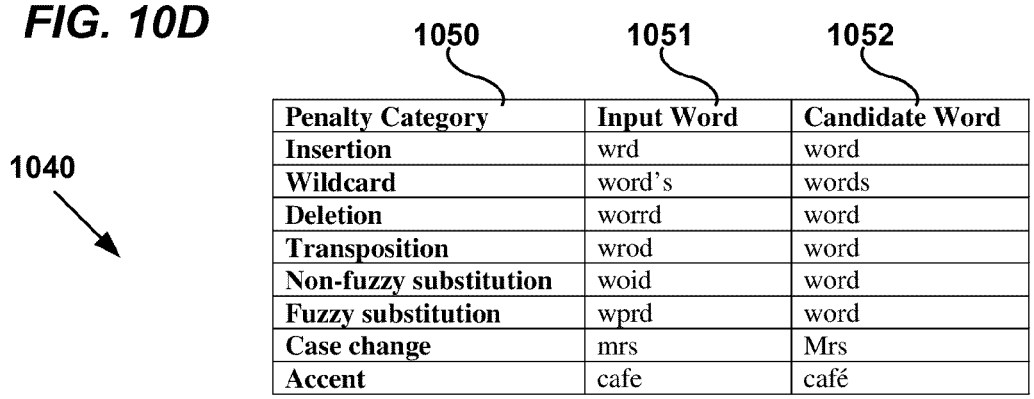
FIG. 10D is a table that illustrates several different penalty categories than can be used to calculate a weighted edit distance between two words.

FIG. 10A is an illustration of three tables 1000, 1004, and 1006 depicting examples of edit distance calculations. As shown in table 1000, the typed word "applicaiotn" has an edit distance of three from the dictionary word "application," as three substitutions are needed to change the typed word into the dictionary word: first, an "i" is replaced with a "t," then an "o" is replaced with an "i," and finally a "t" is replaced with an "o." Similarly, table 1004 shows that "applicatoin" has an edit distance of two from "application," while table 1006 shows that "applicaton" has an edit distance of one from "application" (a single insertion of a single letter "i"). In some embodiments, the edit distance can alternatively be calculated based on the type of edit needed to change the typed word into the dictionary word. Based on a particular implementation, the edit distance shown in table 1004 could be considered an edit distance of two substitutions (i.e., replacing "o" for "i" and "i" for "o"), or an edit distance of a single transposition (i.e., transposing the letters "o" and "i"). Categorizing edit distance categories is discussed further in FIG. 10D-E and accompanying text.

FIG. 10B is a table 1020 of selected word probabilities from a system dictionary. As shown, these word probabilities include both mis-typed (e.g. "momement") and correctly typed (e.g., "mementos") words. For words that do not appear in the dictionary, a probability of other correct words is shown. For example, the text input "momement" was probably intended to be "movement," (p=0.50), but other valid words could also be intended (e.g., moments, p=0.10). Note that even though "mementos" appears in the dictionary (with p=0.85) there is some probability that another word was intended (e.g., "memento,"=0.10). In some examples, the negative log of the probability is used.

FIG. 10C is a table 1030 of selected word probabilities from a user dictionary. Similar to the system dictionary shown in FIG. 10B, both mis-typed and correctly typed words can be in the user dictionary. In contrast to the system dictionary, the user dictionary is based on the user's input history, so words that are commonly mis-typed and corrected (e.g., "momentos" may almost always be corrected by a particular user to "moments") can be more accurately corrected using a user-specific dictionary of word probabilities.

X. Alternative Example Method of Selecting Words from Multiple Sources

FIG. 10D is another example of a method of selecting process blocks for selecting suggestion candidates from multiple data sources including a system dictionary, a user dictionary, a common speller application programming interface (CSAPI) and an input history data source. The techniques shown in FIGS. 10D-E can be used to compare two given words based on several different independent functions, and combine the results for a final result combining word probabilities and weighted edit distances.

A weighted edit distance technique can be used to compare two given words and determines how similar they are. A low total score indicates that two words are very similar and hence there is a high probability that when typing the first word (i.e., a word of the input data), the user actually meant to type the second word (i.e., the word being considered for auto-correction or as a suggestion candidate). On the other hand, a high score indicates that words are dissimilar and that the second word (i.e., the word being considered for auto-correction or as a suggestion candidate) is less applicable to the first word. As discussed below, the weighted edit distance score can be determined by adding individual penalties and finding a set of penalties that results in a minimal total weighted edit distance score.

FIG. 10D is a table 1040 that includes three columns 1050-1052. The first column 1050 lists the names of several penalty categories. The second column 1051 lists an example input word (e.g., an input word received using a touch screen keyboard) for each penalty category. The third column 1052 indicates an example candidate word that the corresponding input word is being compared to. For example, the candidate word could be a possible replacement word for auto-correction or a potential suggestion candidate. Candidate words can be accessed from multiple sources, including a grammar checker, thesaurus, a system dictionary, a user dictionary, a CSAPI, or an IHDS, and one or more of these sources can reside locally (e.g., on a text entry device) or remotely (e.g., in the cloud). Each example row in table 1040 illustrates an edit distance of one for the respective category. As shown in FIG. 10D, penalties used in the weighted edit distance technique can include, but are not limited to, eight penalty categories:

1. Insertion: an input word is in the insertion category when a candidate word is the same as the input word, plus one or more additional characters. An example of an insertion is when a user has typed input word "wrd," which is being compared to candidate word "word." In some examples, the insertion category is defined such that having exactly one additional character places a candidate word in the insertion category (e.g., input word "wrd" vs. candidate word "word"). In other examples, the insertion category is defined such that having one, two, or more additional characters places a candidate word in the insertion category (e.g., "Misisipi" vs. "Mississippi," which is an edit distance of three insertions). In some examples, an additional penalty can be applied depending on the number of additional characters between the input word and the candidate word (e.g., "Misisipi" could have a higher penalty score than "Mississipi").

2. Wildcard is a special case of insertion. An input word is in the wildcard category when a candidate word is the same as the input word, plus one or more designated additional characters, for example, apostrophe or question mark. A lower penalty can be applied for the wild card so that input words are penalized less for the presence of designated wildcard characters. For example, the wildcard penalty is implicated when comparing input words "person's" or "persons'" to candidate word "persons." Similar to the insertion category, the wildcard category can be defined such that having exactly one additional wildcard character places a candidate word in the wildcard category, or the wildcard category can be defined such that having one, two, or more additional wildcard characters places a candidate word in the wildcard category. In some examples, an additional penalty can be applied, depending on the number of additional wildcard characters.

3. Deletion: an input word is in the deletion category when a candidate word is the same as the input word, less an additional character. An example of a deletion is when a user has typed input word "worrd," which is being compared to candidate word "word." Similar to the insertion category, some examples may limit this category to the case where exactly one character has been deleted (e.g., input word "worrd" vs. candidate word "word"). In other examples, one, two, or more deleted characters can place a candidate word in the deletion category (e.g. "bannanna" vs. "banana"). In some examples, an additional penalty can be applied depending on the number of deleted characters between the input word and the candidate word (e.g., "bannanna" could be assigned a higher penalty score than "bannana").

4. Transposition: an input word is in the transposition category when an input word has two consecutive characters reversed (transposed) compared to the candidate word. An example of a transposition is when a user has typed input word "wrod," which is being compared to the candidate word "word" (i.e., the characters "r" and "o" are transposed in the input word). Similar to the insertion and deletion categories, some examples may only consider a word with exactly one transposition to be in the transposition category, while other examples may allow multiple transpositions, with an optional additional penalty (e.g., input word "Mciroosft" vs. candidate word "Microsoft" has two transpositions).

5. Non-fuzzy substitution: an input word is in the non-fuzzy substitution category when the input word has one or more characters that are different than the candidate word, and the different characters are not determined to be adjacent, e.g., the keys for the characters are not physically adjacent on a touch screen keyboard. An example of a non-fuzzy substitution is when the input word is "woid," which is being compared to candidate word "word," and the input was received using a QWERTY keyboard. Similar to the insertion and deletion categories, some examples may only consider a word with exactly one character different to be in the non-fuzzy substitution category, while other examples may allow multiple characters to be different, with an optional additional penalty (e.g., input word "binina" vs. candidate word "banana" has two non-adjacent characters substituted).

As described further below, a determination whether two characters are adjacent is dependent on the input source. For example, a QWERTY touch screen keyboard, a Dvorak touch screen keyboard, a DTMF keyboard (i.e., a standard telephone keypad), a hardware keyboard, and non-keyboard input sources (e.g., from handwriting recognition or voice recognition) can all have different keys designated as adjacent to each other. Further, keyboards based on different languages (e.g., English vs. French) can also have different keys designated as adjacent to each other.

6. Fuzzy substitution: an input word is in the fuzzy substitution category when an input word has one or more characters different than the candidate word, and the keys for the characters are determined to be adjacent (e.g., the different characters can be typed by adjacent keys on a touch screen keyboard). If the two words are in the fuzzy substitution category, an error model is used to dynamically calculate a penalty. The error model can be based on real usage data collected on a physical device with a statistically significant set of keystrokes. The error model can contain different values or probabilities based on the language being used (e.g., English vs. French). For example, on a QWERTY touch screen keyboard, the keys "o" and p" are adjacent. A lower fuzzy substitution penalty can be assigned for the input word "wprd" and candidate word "word," because the characters "o" and "p" are adjacent, and the error model indicates that "wprd" is often changed by users to "word" based on previously collected user data. A higher fuzzy substitution penalty can be assigned for the input word "cave" and candidate word "cafe." This is because even though the keys "v" and "f" are adjacent, based on previously collected user data, the word "cave" is frequently not corrected at all. In some examples, the fuzzy substitution determination can rely not only on input history data but also other candidate sources, for example: dictionaries, thesauruses, or a CSAPI. In these examples, "cave" would be assigned a higher fuzzy substitution penalty than "wprd," because the word "cave" appears in a system dictionary, while "wprd" does not.

7. Case change: an input word is in the case change category when the input words has one or more characters that are different than the candidate words, and the characters only differ based on being uppercase/lowercase. For example, the case change category is indicated when the input word is "mrs." and is being compared to the candidate word "Mrs." Similarly, the case change category is indicated when the input word is "microsoft" and the candidate word is "Microsoft." Similar to the insertion and deletion categories, some examples may only consider a word with exactly one character case difference to be in the case change category, while other examples may allow multiple characters to have case change differences, with an optional additional penalty.

8. Accent: an input word is in the case change category when the input word has one or more characters that are different than the candidate words, and the characters only differ based on an associated accent mark. For example, the accent category is indicated when the input word "cafe" is being compared to the candidate word "café" (i.e., the base character "e" differs from that in the candidate word character only by the accent "é"). Similar to the insertion and deletion categories, some examples may consider a word with exactly one accent character different to be in the accent category, while other examples may allow multiple characters to have accent differences, with an optional additional penalty.

Figure 10E:
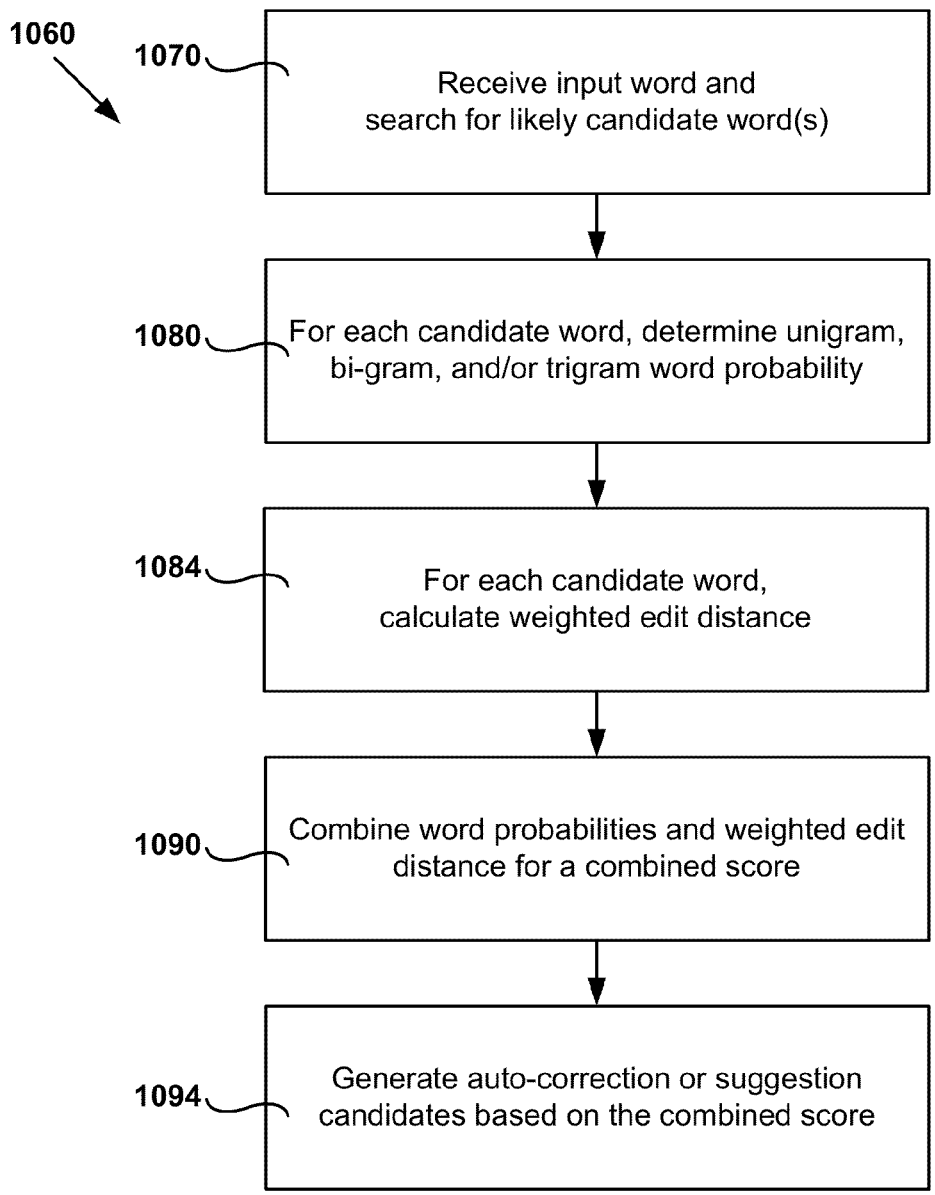
FIG. 10E is a flow chart that outlines a method of determining a score for determining, suppressing, selecting, or ranking auto-corrections or suggestion candidates by combining a weighted edit distance score with a weighted probability score.

FIG. 10E is a flow chart 1060 that outlines a method of determining a score for an input word and a candidate word for use in determining, suppressing, selecting, or ranking auto-corrections or suggestion candidates by combining a weighted edit distance score with a weighted probability score.

At process block 1070, an input word is received (e.g., from a mobile device) and one or more candidate sources are searched for likely candidate words.

At process block 1080, one or more word probabilities are determined for the input word(s) over one or more likely candidate words. In some examples, the candidate sources are only searched for single words (unigrams). In other examples, the candidate sources can be searched for two-word combinations (bi-grams) or three-word combinations (trigrams). For example, the two-word combination "Happy Birthday" is stored in a candidate source as a bi-gram so that possible auto-corrections or suggestion candidates can be determined more readily, regardless of whether the first or second word is misspelled. Similarly, a three word combination such as "best of breed" can be stored in a candidate source such that certain possible errors, for example input words "best or breed" can be designated incorrect even though the word that is incorrect, "or," appears in the system dictionary.

At process block 1084, a weighted edit distance score for the input word(s) over one or more likely candidate words is determined. In some embodiments, the weighted edit distance score can be determined using a simple edit distance as described in FIG. 10C and accompanying text, above. In other embodiments, the weighted edit distance score can be determined using a more complex edit distance technique, such as that described in FIG. 10D and accompanying text, above. In some examples, all eight penalty categories described above can be used, while other examples may use additional or fewer categories.

At process block 1090, the weighted word probabilities from process block 1080 and the weighted edit distances from process block 1084 are combined into a combined score. In order to determine if auto-correction should be suppressed or performed, when given an input word (e.g., a word received with a touch screen keyboard) and a word suggested by the system, a formula can be applied that combines the negative logarithm of the word probability with a weighted edit distance score:

$$C_t > C_p \times -\log(P(\text{Word}_2)) + \frac{C_{ed} \times EditDistance_{Weighted}(\text{Word}_1, \text{Word}_2)}{\text{Length}(\text{Word}_1)}$$

Where:
Word$_1$ is the input word (e.g., a word or input sequence received using a text entry device).

Word$_2$ is a candidate word (e.g., a possible suggestion candidate or auto-correction replacement word).

C$_t$ is an auto-correction threshold (an adjustable constant).

C$_p$ is a word probability multiplier (an adjustable constant).

C$_{ed}$ is a weighted edit distance multiplier (an adjustable constant).

P(Word$_2$) is the probability that Word$_2$ is the desired word, and can be based on at least one or more of the following: a grammar checker, a thesaurus, a system dictionary, a user dictionary, a CSAPI, or an IHDS.

EditDistance$_{Weighted}$ (Word$_1$, Word$_2$) is a weighted penalty score than represents a combined penalty score for input word Word$_1$ and candidate word Word$_2$ evaluated over at least one or more of the following penalty categories: insertion, wildcard, deletion, transposition, non-fuzzy substitution, fuzzy substitution, case change, and accent. The calculation of these eight configurable penalty scores is outlined in the weighted edit distance discussion above.

Length(Word1) is the length of the input word(s), in number of characters.

At process block 1094, the combined score (final result) can be used to generate auto-corrections, suppress auto-corrections, determine suggestion candidates, or rank suggestion candidates. The final result (the right-hand side of the inequality above) can be compared against a flexible threshold value (C$_t$). Adjusting the comparison threshold value C$_t$ determines the frequency and aggressiveness of auto-correction or candidate generation. Similarly, the above formula can also be used to rank suggestion candidates. For example, instead of comparing the final result to a flexible threshold, the final result is used to rank the order that suggestion candidates are presented to a user.

XI. Example Method of Selecting Words Using a Language Model

Figure 11:
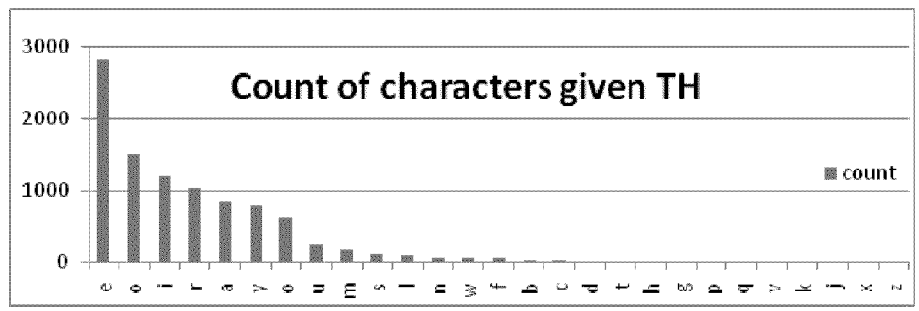
FIG. 11 depicts a histogram indicating the frequency of several next letters following "th" in an English-language model.

FIG. 11 is histogram 1100 indicating the frequencies with which several characters follow "th" user input data in an English language model. As shown, the most likely next character, with a character count of almost 3000, is the letter "e," which would create the very common English word "the." Other character counts are shown for the letters "o," "i," "r," etc. The language model can be created by analyzing a large corpus of text in the target language and counting the number of times each letter appears after letters appearing earlier in a word. Thus, for the corpus shown, the letter "e" appears nearly 3000 times when the letters "th" are the first two letters of a word. As discussed below in FIG. 13 and accompanying text, the language model can be built as a tree, where the tree is traversed starting at the root letter for the start of the word, and traversing the tree as additional letters are added to the word in the input data. For each letter added to the tree, child probability scores are determined that can optionally be used with a touch model to determine the most likely corrections or suggestion candidates for partial input data.

Figure 12A:
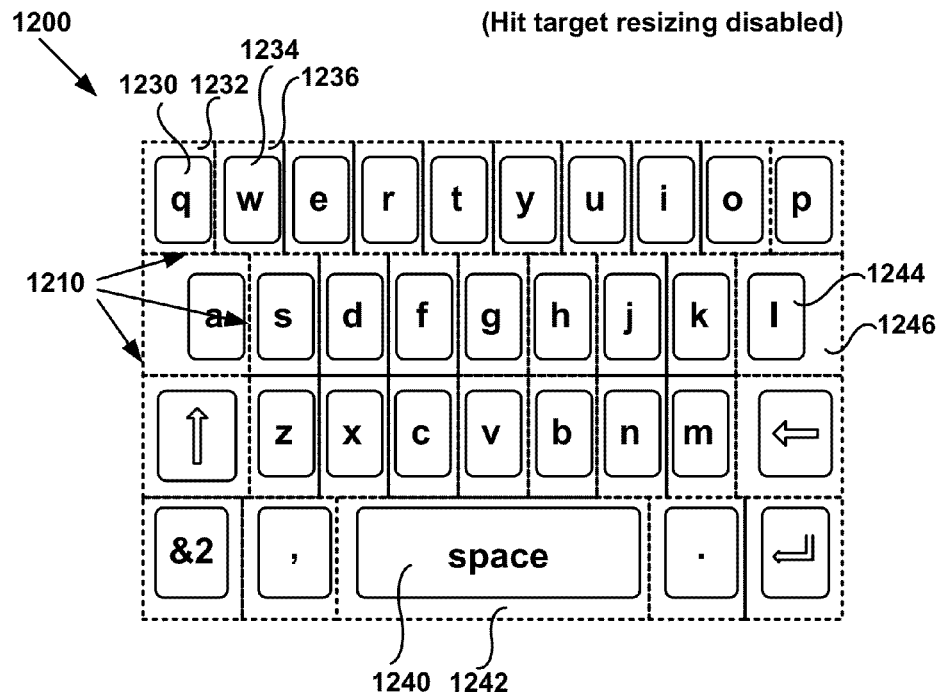
FIG. 12A illustrates a touch-screen keyboard and associated target sizes with hit target resizing disabled.
Figure 12B:
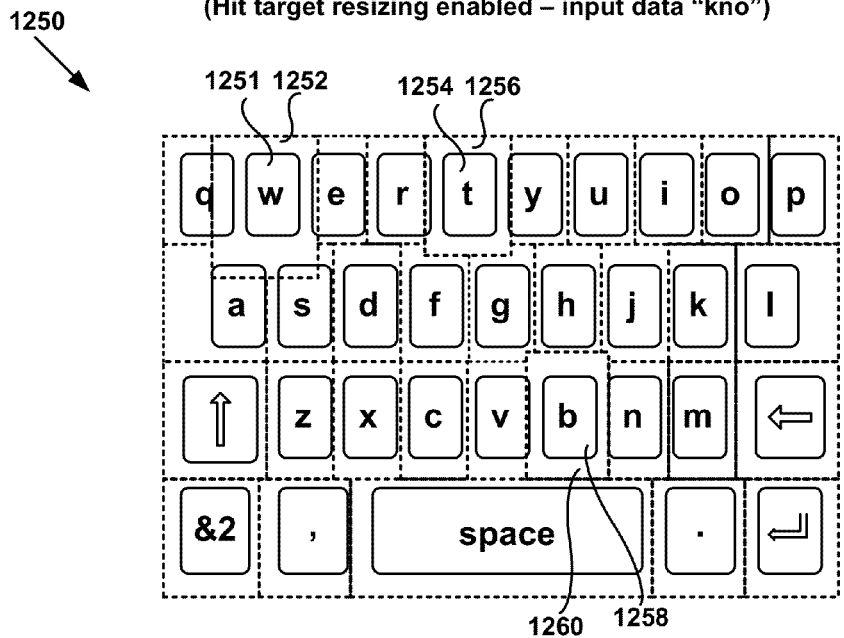
FIG. 12B illustrates a touch screen keyboard and associated target sizes with hit target resizing enabled for the English-language input "kno."
Figure 12C:
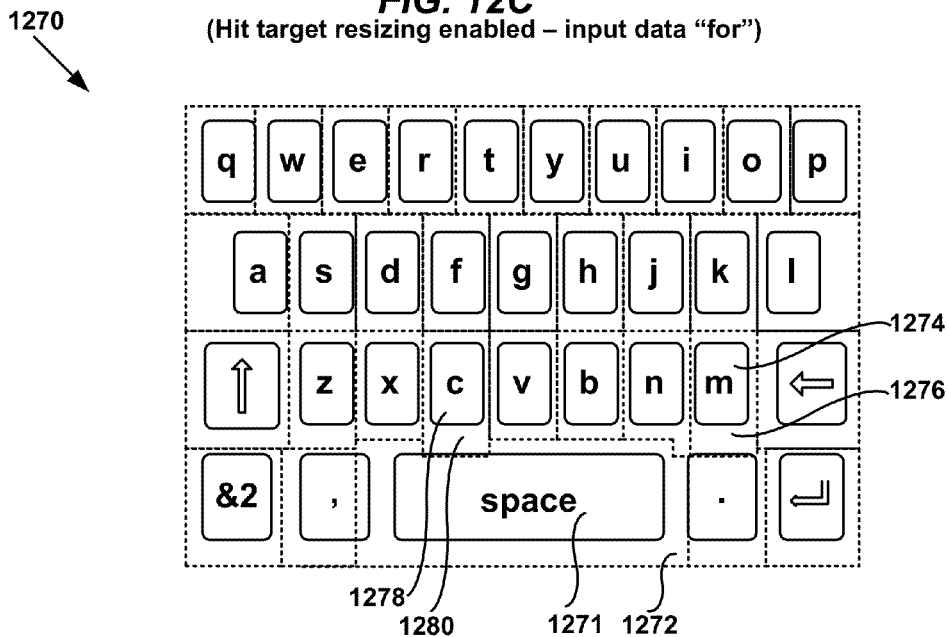
FIG. 12C illustrates a touch screen keyboard and associated key target sizes with hit target resizing enabled for the English-language input "for."

FIGS. 12A-12C depict touch screen keyboards using solid lines to indicate the keys displayed to the user, along with dashed lines outlining the touch zone regions ("target areas"), which indicate the touch screen regions for an associated key on the display. In some embodiments, the dashed lines or other representation of the touch zone regions can be displayed along with or instead of the keys, while in other embodiments, no indication of the actual touch zone region dimensions are indicated on the display.

FIG. 12A depicts a touch screen keyboard 1200 of a mobile device with hit target resizing disabled, that is, the key target area boundaries are simply the default areas around each key and are of similar sizes. As shown, a number of dashed lines 1210 indicate the key target boundaries for the keys 1230, 1234, 1240, 1244, etc. For example, the key "q" 1230 has a target area 1232 that is slightly larger than the key, and that abuts the target area 1236 for the adjacent key "w" 1234. Since most of the keys are of substantially similar size and shape, the corresponding target areas are of a similar size and shape, but certain keys such as the space key 1240 have a much larger size and shape and therefore a corresponding larger target area 1242. Similarly, the "1" key 1244 has some extra space to the side of the touch screen, so its target area 1246 is slightly larger than other similar keys.

FIG. 12B depicts a touch screen keyboard 1250 with hit target resizing enabled, after the mobile device has received input data sequence "kno." As shown, the target areas are expanded non-uniformly for different keys based on language and touch models. For example, the key "w" 1251 is highly probable to be the next key typed (likely to form the word "know"), so its target area 1252 is much larger than other keys of the touch screen keyboard 1200. Similarly, the keys "t" 1254 (likely to form the word "knot") and "b" 1258 (likely to form the word "knob") are more probable than most keys, but less probable than "w" according to the language and touch model, so their respective target areas 1256 and 1260 are sized only slightly larger than in the default target area. While the shape of most of the target areas as shown is rectangular, in other embodiments the target key areas can be of varying sizes and shapes (e.g., circles, trapezoids, etc.) in order to provide more accurate target areas.

FIG. 12C depicts a touch screen keyboard 1270 with hit target resizing enabled, after the mobile device has received the input data sequence "for." As shown, the target areas are expanded non-uniformly for different keys based on language and touch models. For example, because the input data "for" is likely to be a complete word, the probability that the word is complete is high, and so the target area 1272 for the space key 1271 has been greatly enlarged compared to the target areas for the space key shown in FIGS. 12A-12B. Similarly, the probabilities for keys "m" 1274 (probable words: "form," "forms," and "format") and "c" 1278 (probable words: "force," "fork") are determined to be of medium probability, and therefore their respective target areas 1276 and 1280 have been enlarged to a lesser degree that the space key target area 1272. Similarly, the probabilities of the keys period, comma, z, x, v, b, and n is determined to be low, so the corresponding target areas for those keys are not resized.

In some embodiments, the target areas are not limited to simple zones, but can include additional zones based on the proximity of zones to a given key boundary. For example, three zones can be defined: a first zone within the visual boundary of a key (a "direct hit" associated with a 100% probability), a second zone outside the visual boundary of a key by M pixels (a "near miss" associated with a 50% probability), and a third zone outside the boundary if a key by N pixels (a "barely hit" with a 10% probability). The language model probability for the next key can be combined with the touch model probability to determine an overall probability for next keys.

In some embodiments, the touch model is not limited to touch screen X-Y location, but can include: input scope, touch screen pressure, typing speed, touch screen orientation, etc. For example, one set of hit target areas can be used for the when the touch screen is in a landscape orientation, and another used when the touch screen is in a portrait orientation. The hit target areas can be also varied based on input scope, for example, one set of hit target areas can be used for entering addresses, and another set of target areas used for entering body text.

Figure 13:
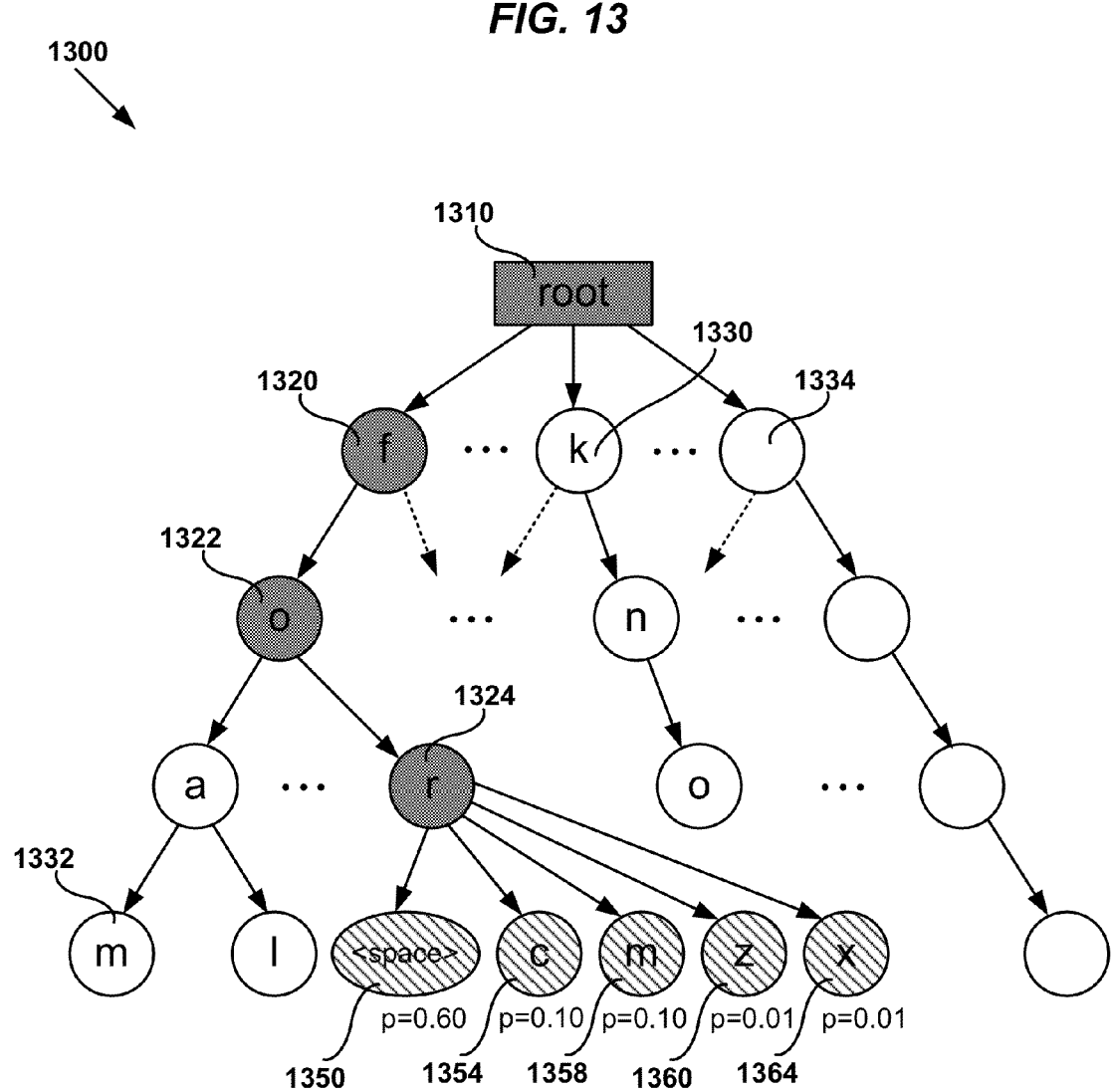
FIG. 13 is a diagram of a data structure for a language probability model.

FIG. 13 depicts a data structure 1300 storing data representing an English-language probability model that can be used with techniques of hit-target resizing described above. As shown, the data structure 1300 is depicted as a tree, but other suitable data structures can also be employed. Starting with input data at the beginning of a new input word, the data structure 1300 is accessed starting with a root node 1310, and child nodes of the data structure are traversed as more character input is received. For example, for the input data sequence "for" shown in FIG. 12C, data structure 1300 is traversed from the root node 1310 to the node 1320 for the character "f," node 1322 for the character "o," and then node 1324 for the character "r." As shown, the shaded nodes 1310, 1320, 1322, and 1324 have already been traversed. The striped nodes 1350, 1354, 1358, 1360, and 1364 indicate the child probability scores associated with these next child nodes being selected. For example, since the word "for" is very common, the node for "<space>" has a higher child probability score (0.60). Similarly, nodes 1354 and 1358 ("c" and "m") have a lower child probability score (0.10), while nodes 1360 and 1364 ("z" and "x") are highly unlikely to be correct and thus have even lower probability scores (0.01). There are many other nodes, e.g. 1330, 1332, and 1334, in the tree, and most nodes in the data structure 1300 are not depicted. In some embodiments, the child probability scores considered include not just the nodes associated with characters actually typed, but also nodes associated with characters that may have been intended, but not actually received as input. For example, if the received keyboard input is "tj," child probability scores for the tj node can be considered, but child probability scores for other nodes, for example, "th" or "ti" will also be assigned a child probability score. The probability scores can be used to generate auto-corrections and suggestion candidates.

In some embodiments, a generic touch model can be used to supplement or replace a learned user-specific touch model. For example, a data collection tool coupled with a soft keyboard device can prompt one or more users to enter a series of phrases to type using a touch screen keyboard device. As the user enters the phrases, the data collection tool logs touch data (e.g., X-Y location, pressure, speed, touch screen orientation, etc.) with the prediction feature turned off. The cursor position associated with the prompted phrase is advanced if the user hits either the exact next key in the phrase, or any of the adjacent keys. By comparing the collected touch data with the prompted phrases, it can be determined for any given touch data, which key the user intended to hit.

By collecting this touch data for many users, simulations can then be run which vary the touch model parameters and then replay the logged touch data, in order to determine the impact that a given set of touch model parameters have on the accuracy of the touch model. For example, a first simulation could be run with the default hit target locations shown in FIG. 12A, while a second simulation could be run with some of the keys shifted one pixel to the left, a third simulation could be run with some the keys shifted one pixel to the bottom, and so forth. After running several simulations, the results can be analyzed to determine the set of parameters that produce the largest general reduction in keyboard error. Thus, a generic touch model based on previously collected simulation data for plural users is generated. Typing error rate reductions as high as 50% have been observed using this technique.

The data collection tool can also be used to output a fuzzy set representing the probability of a given key press being correct. For example, when the desired key is a "q" the probability of pressing a "w" or "e" accidently is known. These scores can be used to weight the child probability scored while traversing a language probability model data structure or user to calculate edit distance scores for sorting candidates. In some examples, a general touch model is used for all keys of a soft keyboard. In other examples, a key-specific touch model is generated for each key. In some examples, an individual user can be prompted to enter a series of training phrases, the data can be logged and simulated using different touch model parameters, and a user-specific touch model generated.

XII. Example Computing Environment

Figure 14:
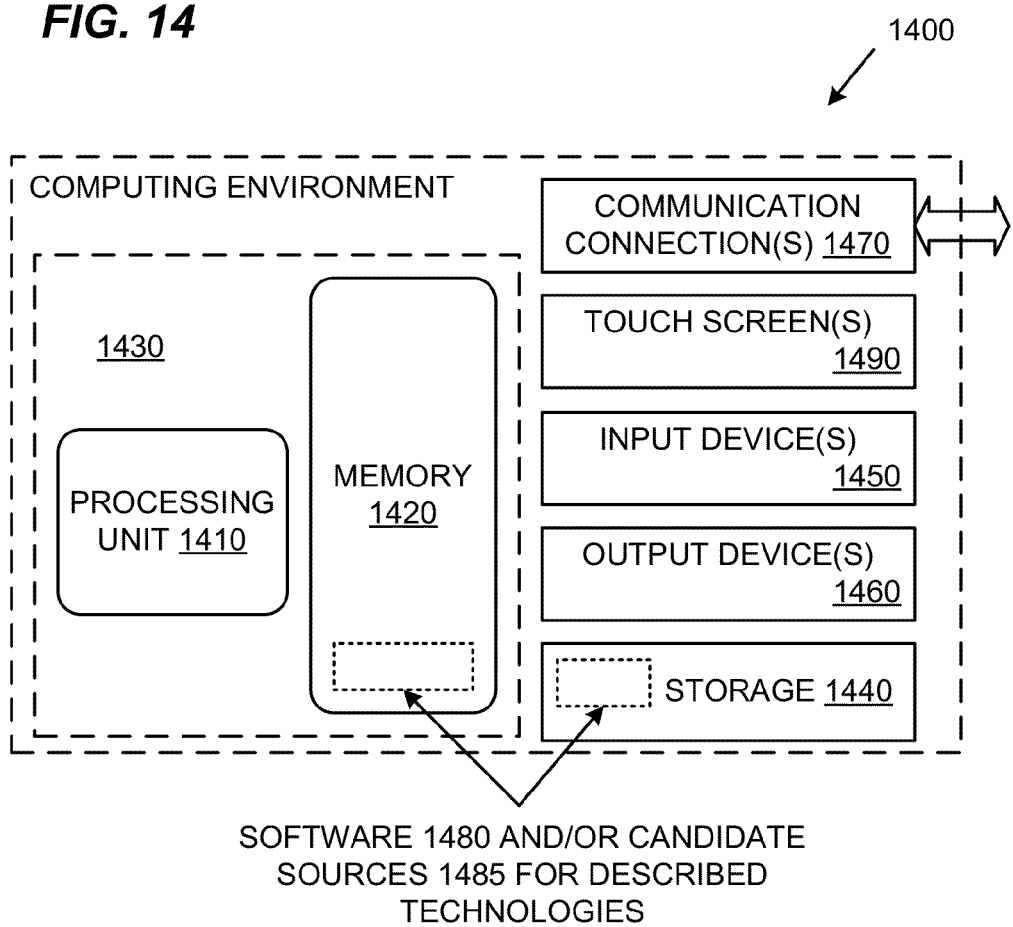
FIG. 14 is a block diagram illustrating a computing environment for an exemplary embodiment of the disclosed technology, including a touch screen and computer-readable storage media.

FIG. 14 illustrates a generalized example of a suitable computing environment 1400 in which described embodiments, techniques, and technologies may be implemented. For example, the computing environment 1400 can implement learning input history data, generating auto-corrections, generating suggestion candidates, and querying language and touch models, as described above.

The computing environment 1400 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 14, the computing environment 1400 includes at least one central processing unit 1410 and memory 1420. In FIG. 14, this most basic configuration 1430 is included within a dashed line. The central processing unit 1410 executes computer-executable instructions and may be a real or a virtual processor. In a multi-processing system, multiple processing units execute computer-executable instructions to increase processing power and as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480 and candidate sources 1485 that can, for example, implement the technologies described herein. A computing environment may have additional features. For example, the computing environment 1400 includes storage 1440, one or more input devices 1450, one or more output devices 1460, one or more communication connections 1470, and one or more touch screens 1490. An interconnection mechanism (not shown) such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and that can be accessed within the computing environment 1400. The storage 1440 stores instructions for the software 1480 and candidate sources 1485, which can implement technologies described herein.

The input device(s) 1450 may be a touch input device, such as a keyboard, keypad, mouse, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400. The touch screen 1490 can act as an input device (receiving touch screen input) and as an output device (displaying the text entry area, suggestion candidates area, and/or touch keyboard).

The communication connection(s) 1470 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1400. By way of example, and not limitation, with the computing environment 1400, computer-readable media include memory 1420, storage 1440, communication media (not shown), and combinations of any of the above.

Computer-readable media are any available media that can be accessed within a computing environment 1400. By way of example, and not limitation, with the computing environment 1400, computer-readable media include memory 1420 and/or storage 1440. As should be readily understood, the term computer-readable storage media includes the media for data storage such as memory 1420 and storage 1440, and not transmission media such as modulated data signals.

XIII. Example Text Entry Device

Figure 15:
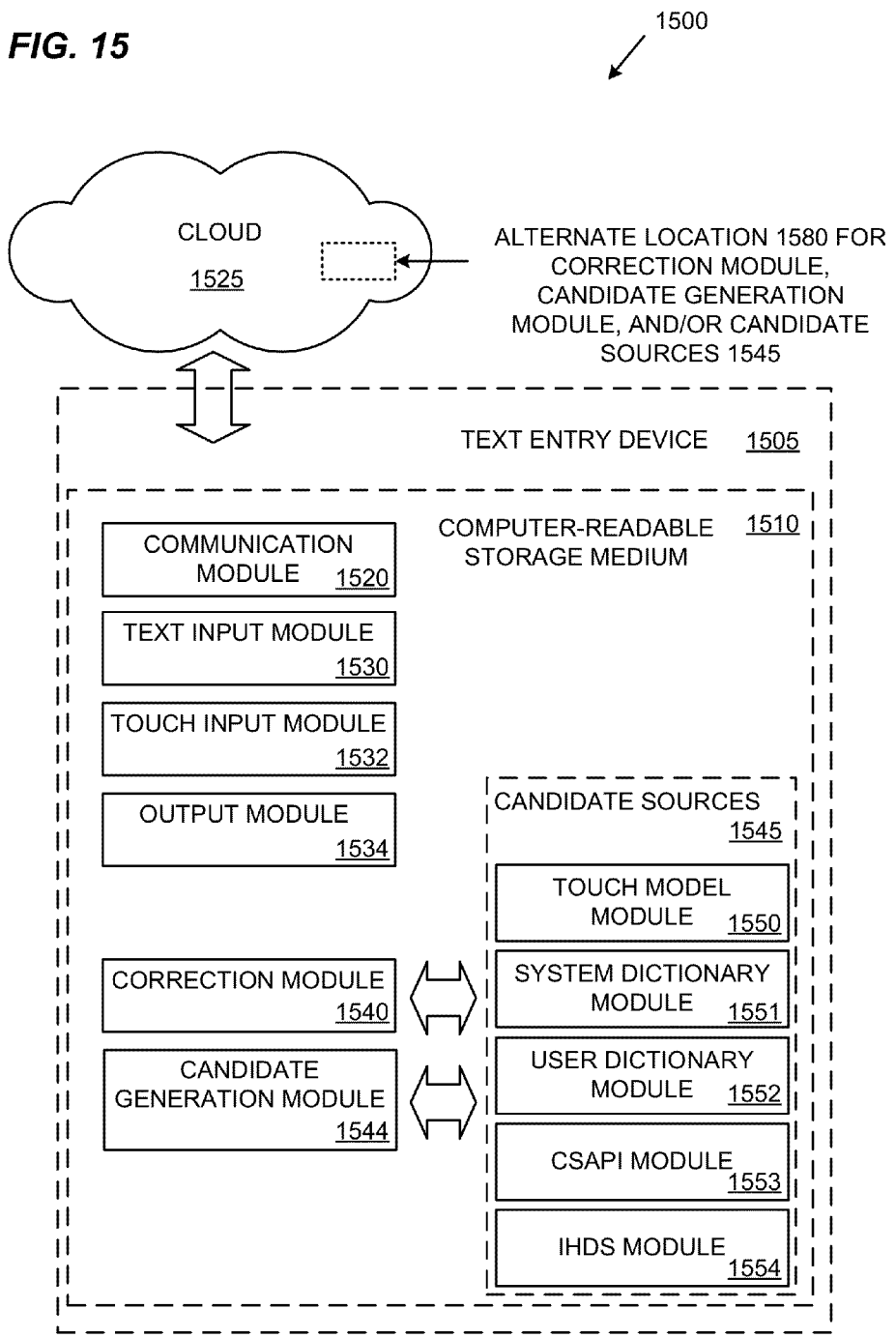
FIG. 15 is a block diagram illustrating a text entry device comprising various modules stored on a computer-readable storage medium for processing text inputs, providing text corrections, and generating suggestion candidates.

FIG. 15 illustrates a generalized example of a suitable implementation environment 1500 of a text entry device 1505 connected to a cloud 1525. The text entry device 1505 includes several modules stored on a computer-readable storage medium 1510, including a text input module 1530 for receiving text entry input, touch input module 1532 for receiving touch screen input from a touch screen (not shown), and an output module 1534 for providing output to a touch screen. The communication module 1520 adapts the text entry device 1505 so that it can communicate with service providers located in the cloud 1525. The computer-readable storage medium 1510 also includes a correction module 1540 for checking and correcting text entries, and a candidate generation module 1544 for generating suggestion candidates. Correction module 1540 and candidate generation module 1544 can communicate with multiple candidate sources 1545 to determine correction and suggestion candidates, including a grammar checking module 1550, a system dictionary module 1551, a user dictionary module 1552, a CSAPI (Common Speller API) module 1553, and an IHDS (input history data source) module 1554. In some embodiments, the correction module 1540, candidate generation module 1544, and/or one or more of the candidate sources 1545 (e.g., modules 1550-1554) can be provided by a service provider in an alternate location 1580 in the cloud 1525. In some embodiments, the correction module 1540 is configured to interact with the candidate generation module 1544 instead of accessing the individual candidate sources 1545 directly.

XIII. Example Alternatives and Combinations

The techniques and solutions described in this application can be used in various combinations to provide more efficient text entry and correction with text entry devices, including mobile devices such as smart phones.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:
 receiving first input data;
 automatically learning user tendencies based on the first input data to generate input history data;
 receiving second input data with a touch screen keyboard and displaying one or more words of the second input data on a touch screen display associated with the touch screen keyboard, wherein the receiving second input data further comprises non-uniformly resizing a first and a second target area of the touch screen keyboard based on a probability that a key associated with the first target area has a different probability than a key associated with the second target area; and
 one or more characters of the second input data are determined at least in part using the first resized target area, the second resized target area, or the first and the second resized target areas.

2. The method of claim 1, wherein the receiving first input data comprises receiving a completion event indicating that the first input data is complete, wherein the completion event is associated with the sending of a text message, instant message, or email.

3. The method of claim 1, wherein the automatically learning user tendencies comprises analyzing user-specific web content associated with a user.

4. The method of claim 1, wherein the input history data includes touch position data for one or more key presses received using a touch screen keyboard.

5. The method of claim 1, wherein:
 the first input data comprises a word; and the input history data comprises data representing the last time a word was used.

6. The method of claim 1, wherein the input history data comprises typing speed data for one or more keystrokes received using a hardware or touch screen keyboard.

7. The method of claim 1, wherein the input history data comprises orientation data representing the orientation of a touch screen as being in a landscape orientation or in a portrait orientation while receiving the first input data.

8. The method of claim 1, wherein:
the first input data and the second input data are received at a computing cloud from a text entry device;
the text entry device is at a location remote from the cloud;
the automatically learning user tendencies occurs in the cloud; and
the generated auto-corrections or suggestion candidates are provided from the cloud to the text entry device.

9. The method of claim 1, wherein the resizing the one or more target areas includes using a generic touch model based on previously-collected touch screen keyboard typing data for plural users, the generic touch model including one or more child probability scores for one or more input data sequences for the typing data.

10. One or more non-transitory computer-readable storage media or memory storing computer-readable instructions that when executed cause a computer to perform a method, the method comprising:
receiving first input data;
automatically learning user tendencies based on the first input data to generate input history data;
receiving second input data with a touch screen keyboard and displaying one or more words of the second input data on a touch screen display associated with the touch screen keyboard, wherein the receiving second input data further comprises non-uniformly resizing a first and a second target area of the touch screen keyboard based on a probability that a key associated with the first target area has a different probability than a key associated with the second target area;
with the touch screen display, receiving touch input over a selected one of the displayed words; and
responsive to the receiving touch input, generating suggestion candidates for the selected word based on the input history data and the second input data.

11. The computer-readable storage media or memory of claim 10, wherein the automatically learning user tendencies comprises analyzing user-specific web content associated with a user.

12. The computer-readable storage media or memory of claim 10, wherein the input history data includes touch position data for one or more key presses received using a touch screen keyboard.

13. The computer-readable storage media or memory of claim 10, wherein the input history data comprises orientation data representing the orientation of a touch screen as being in a landscape orientation or in a portrait orientation while receiving the first input data.

14. The computer-readable storage media or memory of claim 10, wherein:
the receiving second input data further comprises resizing one or more target areas associated with one or more associated keys on a touch screen keyboard based on one or more characters previously received in the second input data; and
one or more characters of the second input data are determined at least in part using the resized target areas.

15. The computer-readable storage media or memory of claim 14, wherein the resizing the one or more target areas includes using a generic touch model based on previously-collected touch screen keyboard typing data for plural users, the generic touch model including one or more child probability scores for one or more input data sequences for the typing data.

16. One or more non-transitory computer-readable storage media or memory storing computer-readable instructions that when executed cause a computer to perform a method, the method comprising:
receiving first input data using a touch screen keyboard;
a step for automatically learning user tendencies based on the first input data to generate input history data, the input history data comprising typing speed data for the received first input data;
a step for receiving second input data with a touch screen keyboard and displaying one or more words of the second input data on a touch screen display associated with the touch screen keyboard, wherein:
the receiving second input data further comprises non-uniformly resizing a first and a second target area of the touch screen keyboard based on a probability that a key associated with the first target area has a different probability than a key associated with the second target area;
with the touch screen display, receiving touch input over a selected one of the displayed words; and
responsive to the receiving touch input, generating suggestion candidates for the selected word based on the input history data and the second input data, the second input data comprising typing speed data for the received second input data.

17. One or more non-transitory computer-readable storage media or memory storing computer-readable instructions that when executed cause a computer to perform a method, the method comprising:
receiving first input data;
automatically learning user tendencies based on the first input data to generate input history data;
receiving second input data with a touch screen keyboard by non-uniformly resizing a first and a second target area of the touch screen keyboard, wherein the non-uniform resizing is based on a probability that a key associated with the first target area has a different probability than a key associated with the second target area;
displaying one or more words of the second input data on a touch screen display;
with the touch screen display, receiving touch input over a selected one of the displayed words; and
responsive to the receiving touch input, generating auto-corrections or suggestion candidates for the selected word based on the input history data and the second input data.

18. The non-transitory computer-readable storage media or memory of claim 17, wherein the resized target areas include two or more zones, each of the zones for a respective target area being associated with a different language model probability of a respective associated key being correct.

19. The non-transitory computer-readable storage media or memory of claim 17, wherein:
the input history data comprises orientation data representing the orientation of a touch screen display as being in a landscape orientation or in a portrait orientation while receiving the first input data; and
at least one of the different language model probabilities is different when the touch screen is detected as being in a landscape orientation than when the touch screen display is detected as being in a portrait orientation.

20. The non-transitory computer-readable storage media or memory of claim 17, wherein the input history data includes touch position data for one or more key presses received using a touch screen keyboard.

21. A method, comprising:
receiving first input data;
automatically learning user tendencies based on the first input data to generate input history data;
receiving second input data with a touch screen keyboard by non-uniformly resizing a first and a second target area of the touch screen keyboard with the touch screen display, the resizing including using a generic touch model based on previously-collected touch screen keyboard typing data for plural users, the generic touch model including one or more child probability scores for one or more input data sequences for the typing data;
receiving touch input over a selected one of the displayed words; and
responsive to the receiving touch input, generating autocorrections or suggestion candidates for the selected word based on the input history data and the second input data.

22. The method of claim 21, wherein the resized target areas include two or more zones, each of the zones for a respective target area being associated with a different language model probability of a respective associated key being correct.

23. The method of claim 21, wherein the generic touch model is based at least in part on simulation run using varying touch model parameters and replayed logged touch data.

24. The method of claim 21, wherein the input history data includes touch position data for one or more key presses received using a touch screen keyboard.

25. The method of claim 21, wherein the touch screen display provides no visual indication of the dimensions of the first and second target areas.

* * * * *